United States Patent
Tajima et al.

(10) Patent No.: US 9,294,987 B2
(45) Date of Patent: Mar. 22, 2016

(54) COMMUNICATION CONTROL METHOD, COMMUNICATION CONTROL APPARATUS AND RADIO COMMUNICATION APPARATUS

(71) Applicant: FUJITSU LIMITED, Kawasaki-shi, Kanagawa (JP)

(72) Inventors: Yoshiharu Tajima, Yokohama (JP); Kazuaki Ando, Shibuya (JP); Michiharu Nakamura, Yokosuka (JP); Yoshinori Tanaka, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 20 days.

(21) Appl. No.: 14/309,349

(22) Filed: Jun. 19, 2014

(65) Prior Publication Data

US 2015/0009837 A1    Jan. 8, 2015

(30) Foreign Application Priority Data

Jul. 5, 2013   (JP) .................................. 2013-142141

(51) Int. Cl.
*H04W 48/02* (2009.01)
*H04L 12/26* (2006.01)
(Continued)

(52) U.S. Cl.
CPC ............... *H04W 48/02* (2013.01); *H04L 43/08* (2013.01); *H04L 47/32* (2013.01); *H04W 28/0231* (2013.01); *H04W 28/0284* (2013.01); *H04W 76/045* (2013.01)

(58) Field of Classification Search
CPC .... H04W 48/02; H04W 76/04; H04B 7/2606; H04L 1/0026; H04L 1/1607; H04L 2001/0097

USPC .......................................................... 370/252
See application file for complete search history.

(56) References Cited

U.S. PATENT DOCUMENTS

| | | | | |
|---|---|---|---|---|
| 2010/0022184 A1* | 1/2010 | Khoshnevis | ......... | H04B 7/2606 455/7 |
| 2011/0081903 A1* | 4/2011 | Cai | ................... | H04W 36/0055 455/424 |

(Continued)

FOREIGN PATENT DOCUMENTS

JP    2004-297479    10/2004

OTHER PUBLICATIONS

3GPP TR 25.913 V7.3.0—3rd Generation Partnership Project; Technical Specification Group Radio Access Network; Requirements for Evolved Utra (E-UTRA) and Evolved Utran (E-UTRAN) (Release 7) (Mar. 2006).

(Continued)

*Primary Examiner* — Chi H Pham
*Assistant Examiner* — Robert Lopata
(74) *Attorney, Agent, or Firm* — Fujitsu Patent Center

(57) ABSTRACT

In a radio communication system in which a radio communication apparatus performs communication with another apparatus via a radio relay apparatus, a communication quality value indicating communication quality between the radio communication apparatus and the radio relay apparatus is measured, a threshold for deciding a level of the communication quality is determined on the basis of a past tendency of the communication quality value, and transmission of contents between the radio communication apparatus and the other apparatus is blocked while a present value of the communication quality is smaller than the threshold.

8 Claims, 26 Drawing Sheets

(51) Int. Cl.
  *H04W 28/02* (2009.01)
  *H04L 12/823* (2013.01)
  *H04W 76/04* (2009.01)

(56) References Cited

U.S. PATENT DOCUMENTS

| | | | | |
|---|---|---|---|---|
| 2011/0194432 A1* | 8/2011 | Kato | ............... | H04W 74/002 370/252 |
| 2011/0273999 A1* | 11/2011 | Nagaraja | ............ | H04B 7/15557 370/252 |
| 2012/0213148 A1* | 8/2012 | Saito | ................ | H04B 7/15542 370/315 |
| 2012/0218934 A1* | 8/2012 | Takehana | ........... | H04B 7/15557 370/315 |
| 2013/0005329 A1* | 1/2013 | Kawasaki | ............. | H04B 7/155 455/422.1 |
| 2013/0022025 A1* | 1/2013 | Watanabe | ............ | H04W 36/30 370/332 |

OTHER PUBLICATIONS

3GPP TR 36.913 V8.0.1—3rd Generation Partnership Project; Technical Specification Group Radio Access Network; Requirements for further advancements for Evolved Universal Terrestrial Radio Access (E-UTRA) (LTE-Advanced) (Release 8) (Mar. 2009).

* cited by examiner

INPUT RESULT OF THRESHOLD DECISION
FROM RADIO COMMUNICATION APPARATUS

INPUT COMMUNICATION QUALITY VALUE
FROM RADIO COMMUNICATION APPARATUS

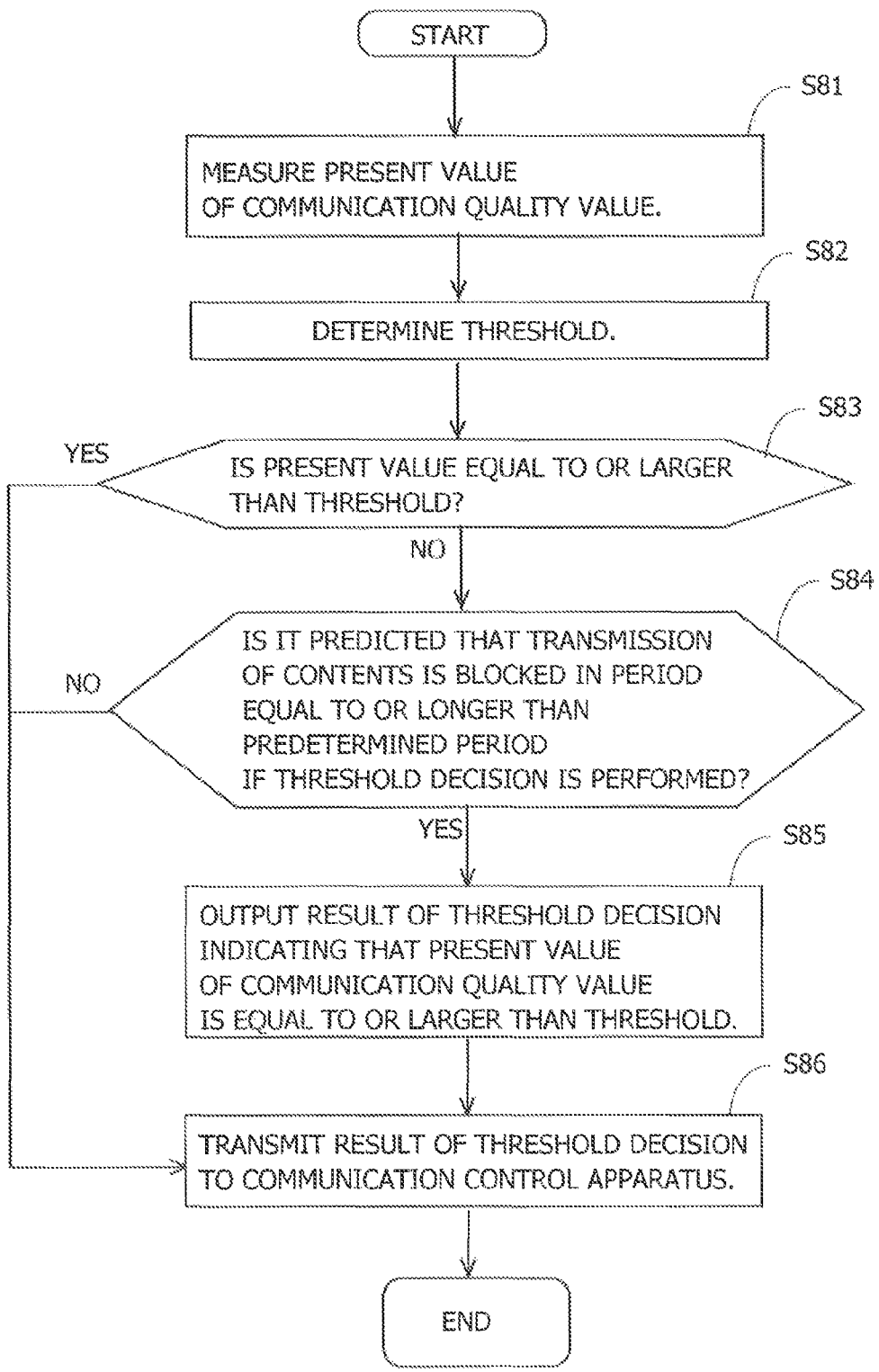

COMMUNICATION CONTROL METHOD, COMMUNICATION CONTROL APPARATUS AND RADIO COMMUNICATION APPARATUS

CROSS-REFERENCE TO RELATED APPLICATION

This application is based upon and claims the benefit of priority of the prior Japanese Patent Application No. 2013-142141, filed on Jul. 5, 2013, the entire contents of which are incorporated herein by reference.

FIELD

The embodiments discussed herein are related to a communication control method, a communication control apparatus and a radio communication apparatus.

BACKGROUND

In a mobile communication system, a cell is formed as a range in which a radio base station and a mobile station such as a cellular phone can perform transmission and reception. Further, a plurality of the cells is combined and a communicable range covers a wide area. In such a communication system, the mobile station continues communication while switching the radio base station, which the mobile station communicates with, according to movement. A system of the communication system explained above is called a cellular system.

Currently, a service of a third generation mobile communication system by a Wideband Code Division Multiple Access (W-CDMA) or Code Division Multiple Access (CDMA) system is performed. High Speed Downlink Packet Access (HSDPA), which is a downlink high-speed transmission technology, and High Speed Uplink Packet Access (HSUPA), which is an uplink high-speed transmission technology, are proposed. High Speed Packet Access (HSPA) obtained by combining these technologies, HSPA+, which is an advanced system of the HSPA, and the like are proposed. On the other hand, examination of a next generation mobile communication system, which enables higher-speed communication, is underway.

In the $3^{rd}$ Generation Partnership Project (3GPP), examination of LTE-advanced, which is an advanced version of Long Term Evolution (LTE) started to be in service around 2010 is performed targeting a service start around 2015 (see, for example, Non-Patent document 1 and Non-Patent document 2).

DOCUMENTS OF PRIOR ARTS

Non-Patent Document

[Non-Patent document 1] "3GPP TR25.913 V7.3.0", (France), The 3rd Generation Partnership Project, March 2006

[Non-Patent document 2] "3GPP TR36.913 V8.0.1", (France), The 3rd Generation Partnership Project, March 2009

SUMMARY

The present proposal discloses a communication control method in a radio communication system in which a radio communication apparatus performs communication with another apparatus via a radio relay apparatus, the communication control method includes: measuring a communication quality value indicating communication quality between the radio communication apparatus and the radio relay apparatus; determining, on the basis of a past tendency of the communication quality value, a threshold for deciding a level of the communication quality; and blocking, while a present value of the communication quality value is smaller than the threshold, transmission of data between the radio communication apparatus and the other apparatus. Note that the communication control method disclosed in the present proposal can also be grasped from an aspect of a communication control apparatus or a radio communication apparatus.

The object and advantages of the invention will be realized and attained by means of the elements and combinations particularly pointed out in the claims. It is to be understood that both the foregoing general description and the following detailed description are exemplary and explanatory and are not restrictive of the invention.

BRIEF DESCRIPTION OF DRAWINGS

FIG. 22 is a diagram illustrating a flow of communication control of the radio communication apparatus in the modification 22.

DESCRIPTION OF EMBODIMENTS

Figure 1:
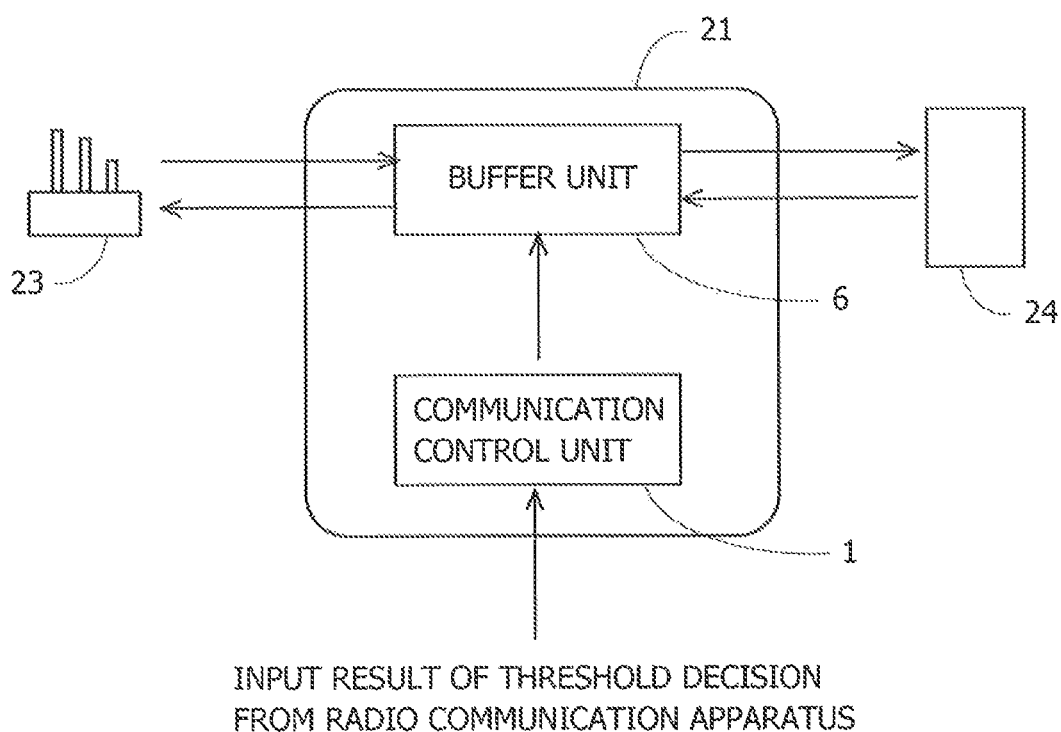
FIG. 1 is a diagram illustrating the configuration of a communication control apparatus in a first embodiment.

When a radio communication apparatus performs communication via a radio relay apparatus such as a base station, fluctuation sometimes occurs in communication quality of the radio communication apparatus according to a distance between the radio communication apparatus and the radio relay apparatus, arrangement of buildings and natural objects between the radio communication apparatus and the radio relay apparatus, and the like. There is a limit in the number of radio communication apparatuses that the radio relay apparatus can simultaneously process. Therefore, it is desirable to effectively utilize limited resources of the radio relay apparatus.

When a radio communication apparatus having low communication quality performs transmission of data with another apparatus via the radio relay apparatus, in some case, the limited resources of the radio relay apparatus are not considered to be effectively utilized. A reason for this is as explained below. When the radio communication apparatus having low communication quality performs transmission of data, it takes time until completion of the transmission of the data. There is a limit in the number of radio communication apparatuses that the radio relay apparatus can process. Therefore, in some case, time in which the other radio communication apparatuses might not be able to perform communication via the radio relay apparatus could be long.

Embodiments disclosed in the present proposal are explained below on the basis of the drawings. The configurations of the embodiments explained blow are illustrations. The present proposal is not limited to the configurations of the embodiments disclosed below.

<<First Embodiment>>

One aspect of an embodiment of the disclosure is illustrated as a communication control apparatus explained below. The communication control apparatus obtains a result of threshold decision for communication quality. In the threshold decision, while a present value of a communication quality value is smaller than a threshold, the communication control apparatus blocks transmission of data between a radio communication apparatus and a server. The data exchanged between an apparatus that provides a service such as the server and the radio communication apparatus is hereinafter referred to as contents. The server is an example of another apparatus.

In the threshold decision in the first embodiment, a threshold is used that is determined to decide a level of the communication quality on the basis of a past tendency of the communication quality value indicating communication quality between the radio communication apparatus and a radio relay apparatus measured by the radio communication apparatus. In the first embodiment, the threshold decision is illustrated as decision processing for comparing a present value of the communication quality value and the threshold.

As the threshold for deciding a level of the communication quality, a threshold for deciding that the communication quality of the radio communication apparatus is relatively high communication quality is desirable. If the present value of the communication quality value exceeds the threshold, transmission of contents is smoothly performed. Therefore, when the present value of the communication quality value exceeds the threshold, even if the radio communication apparatus performs exchange of contents via the radio relay apparatus for a certain degree of a period, it is highly likely that resources of the radio relay apparatus are effectively utilized.

The radio communication apparatus includes an apparatus communicating by radio. A communication control method disclosed in the present proposal can be applied to, for example, a cellular phone, a smart phone, a tablet terminal, a Personal Digital Assistant (PDA), a mobile router, a notebook personal computer, a module such as a data communication card for adding a communication unit to a personal computer, and the like.

The radio relay apparatus includes an apparatus relaying radio communication. The communication control method disclosed in the present proposal can be applied to, for example, a base station of a cellular phone and a Personal Handy-Phone System (PHS) and an access point of a wireless LAN.

As the communication quality value measured by the radio communication apparatus, for example, a Signal to Interference Power Ratio (SIR) can be used. The SIR can be measured by a general communication program incorporated in the radio communication apparatus. Details of the communication program for measuring the SIR are omitted.

As the threshold for deciding a level of the communication quality on the basis of a past tendency of the communication quality value, for example, a past statistical value of communication quality values can be used. For example, when the SIR is used as the communication quality value and an average of the SIR is used as the threshold, the following expression is illustrated as an expression for deciding the threshold:

$$TH_t = (1-\alpha)TH_{t-1} + \alpha SIR, TH_0 = SIR, 0 < \alpha \le 1 \quad \text{Expression (1)}$$

Expression (1) is an expression for calculating a present threshold according to a weighted average of a past threshold and a present SIR. THt of Expression (1) is an illustration of a threshold of the SIR at time t. SIR of Expression (1) is the SIR at time t measured by the radio communication apparatus. In Expression (1), as $\alpha$ is larger, THt is closer to the SIR at time t. In Expression (1), when $\alpha=1$, THt is the SIR at time t.

FIG. 1 is a diagram illustrating the configuration of a communication control apparatus 21 in the first embodiment. Note that, in FIG. 1, sections related to the first embodiment are described. In FIG. 1, the communication control apparatus 21 is located between a radio relay apparatus 23 and a server 24. However, it is also possible to adopt a configuration in which the communication control apparatus 21 is built in the radio relay apparatus 23, the server 24, or a radio communication apparatus. A communication system among the radio relay apparatus 23, the communication control apparatus 21, and the server 24 is not particularly limited. For example, the radio relay apparatus 23, the communication control apparatus 21, and the server 24 may be connected by various networks such as a wired core network, the Internet, a Local Area Network (LAN), an InfiniBand, a dedicated bus by a computer manufacturer, and a wireless network such as a wireless LAN. In FIG. 1, as the configuration of the communication control apparatus 21 in the first embodiment, a communication control unit 1 and a buffer unit 6 are illustrated.

A result of threshold decision is input to the communication control unit 1 from the radio communication apparatus. While a present value of a communication quality value is smaller than the threshold as a result of the threshold decision, the communication control unit 1 instructs the buffer unit 6 to block transmission of contents between the radio communication apparatus and the server 24. The buffer unit 6 temporarily accumulates the contents communicated between the radio communication apparatus and the server 24. The communication control unit 1 that inputted the result of threshold decision is an illustration of obtaining a result of the threshold decision. The communication control unit 1 instructing the buffer unit 6 to block the transmission of contents is an illustration of blocking transmission of contents between the radio communication apparatus and another apparatus. The communication control unit 1 and the buffer unit 6 may be formed by a processor such as a Central Processing Unit (CPU) executing a computer program on a main storage. The communication control unit 1 and the buffer unit 6 may be hardware including a digital circuit and an analog circuit.

Note that the radio communication apparatus executes, for example, processing explained below to thereby perform the threshold decision. The radio communication apparatus measures a communication quality value. The radio communication apparatus calculates an average of measured past communication quality values and sets the average as the threshold. Further, the radio communication apparatus compares the present value of the communication quality value and the threshold and transmits a result of the comparison to the communication control unit 1 of the communication control apparatus 21. The average of the past communication quality value is an illustration of a threshold for deciding a level of communication quality on the basis of a past tendency of the communication quality value.

Figure 2:
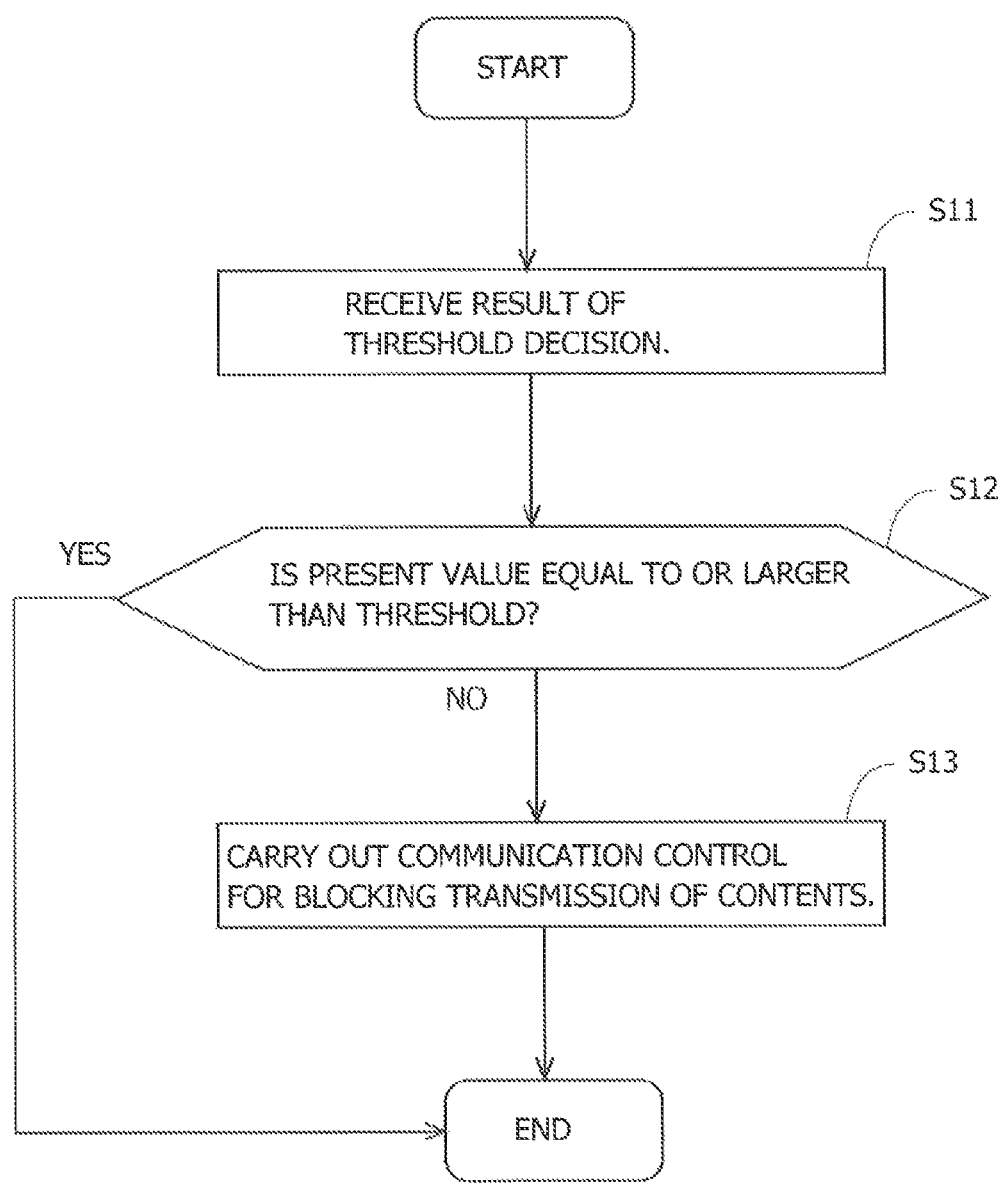
FIG. 2 is a diagram illustrating a flow of communication control performed by the communication control apparatus in the first embodiment.

FIG. 2 is a diagram illustrating a flow of communication control performed by the communication control apparatus 21 in the first embodiment. The flow of the communication control performed by the communication control apparatus 21 in the first embodiment is explained with reference to FIG. 2. The communication control unit 1 receives a result of the threshold decision from the radio communication apparatus (S11). When the present value of the communication quality value is equal to or larger than the threshold, the communication unit 1 does not block transmission of contents. When the present value of the communication quality value is smaller than the threshold, the communication control unit 1 advances the processing to S13 (S12). The communication control unit 1 instructs the buffer unit 6 to block the transmission of contents (S13).

Figure 3A:
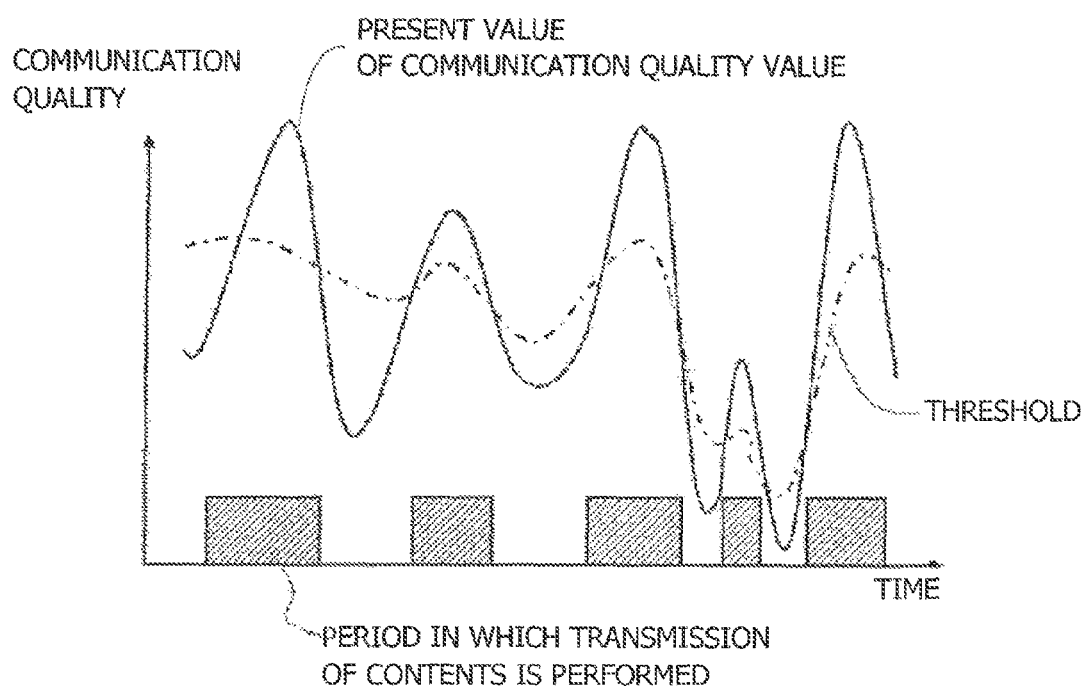
FIG. 3A is a diagram illustrating, in the case in which the communication control apparatus disclosed in the first embodiment is used, fluctuation in a present value of a communication quality value, fluctuation in a threshold determined on the basis of a past tendency of the communication quality value, and a period in which transmission of contents is performed.

FIG. 3A is a diagram illustrating, in the case in which the communication control apparatus 21 disclosed in the first embodiment is used, fluctuation in the present value of the communication quality value, fluctuation in the threshold determined on the basis of the past tendency of the communication quality value, and a period in which the transmission of contents is performed. In the communication control apparatus 21 in the first embodiment, as illustrated in FIG. 3A, the threshold is determined on the basis of the past tendency of the communication quality value. That is, the threshold reflects past results. Therefore, in the communication control apparatus 21 in the first embodiment, present communication quality of the radio communication apparatus is decided on the basis of the past tendency of the communication quality value.

With the communication control apparatus 21 in the first embodiment, it is possible to control communication according to a past situation of the communication quality of the radio communication apparatus. That is, a radio communication apparatus having high communication quality can transmit contents via the radio relay apparatus 23. Transmission of contents by a radio communication apparatus having low communication quality is blocked by the communication control apparatus 21. As a result, a radio communication apparatus having high communication quality and capable of smoothly transmitting contents can preferentially use resources of the radio relay apparatus 23. That is, with the communication control apparatus 21 in the first embodiment, it is possible to effectively utilize the resources of the radio relay apparatus 23.

<Comparative Example>

In the first embodiment, the threshold is determined on the basis of the past tendency of the communication quality value. However, besides such a method of determining a threshold, for example, a method of determining a threshold according to a region where communication is performed is also conceivable. For example, the communication control apparatus 21, the server 24, or another communication apparatus divides a service area of the radio relay apparatus 23 into grids in a fixed range and determines thresholds of the grids in advance. As the thresholds of the grids, thresholds of a SIR by a cumulative distribution factor (CDF) generated from quality information of the grids are illustrated. The communication control apparatus 21 or the like may store the determined thresholds in association with the grids. A method is also conceivable in which the communication control apparatus 21 compares the present value of the communication quality value of the radio communication apparatus and a threshold stored in a database to perform threshold decision and performs communication control.

Figure 3B:
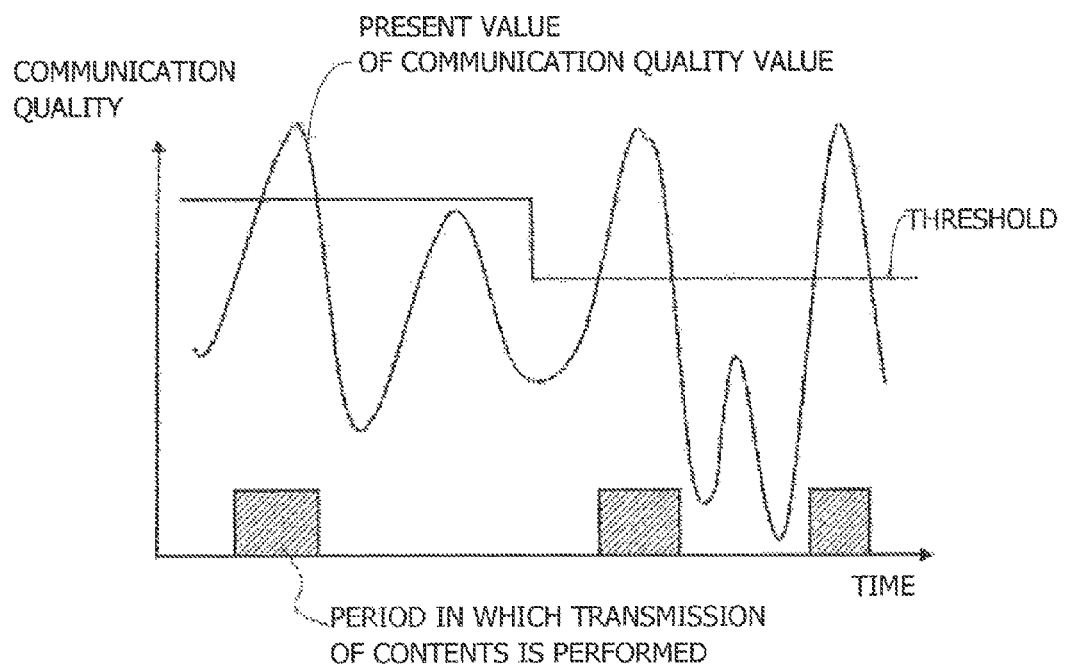
FIG. 3B is a diagram illustrating, in the case in which communication control by a system for storing a threshold in a database in advance is performed, fluctuation in a present value of a communication quality value, fluctuation in a threshold set for each of areas, and a period in which transmission of contents is performed.

FIG. 3B is a diagram illustrating, in the case in which communication control by the system for storing the threshold in the database in advance is performed, fluctuation in the present value of the communication quality value, fluctuation in the threshold set for each of the grids, and a period in which the transmission of contents is performed. As illustrated in FIG. 3B, in this system, the thresholds are determined by averaging ranges of the grids. Therefore, fluctuation in the communication quality in the same grid is not reflected on the thresholds. Therefore, it is difficult to perform communication control corresponding to fluctuation in the communication quality of the radio communication apparatus in the past. Because of necessity for setting the database, the configuration of the communication control system is complicated. Burdens in terms of costs and maintenance are large. With the communication control apparatus 21 in the first embodiment, the database does not have to be prepared in advance. The communication control apparatus 21 decides the present communication quality on the basis of the fluctuation in the communication quality between the communication apparatus and the communication control apparatus 21. Therefore, it is possible to perform flexible communication control corresponding to a situation.

<Modification 11>

In the communication control apparatus 21 in the first embodiment, the result of the threshold decision is input from the radio communication apparatus. In the communication control apparatus 21 in a modification 11 explained below, a configuration for carrying out the threshold decision is added to the communication control apparatus 21 in the first embodiment. Therefore, the present value of the communication quality value is input to the communication control apparatus 21 in the modification 11 from the radio communication apparatus.

Figure 4:
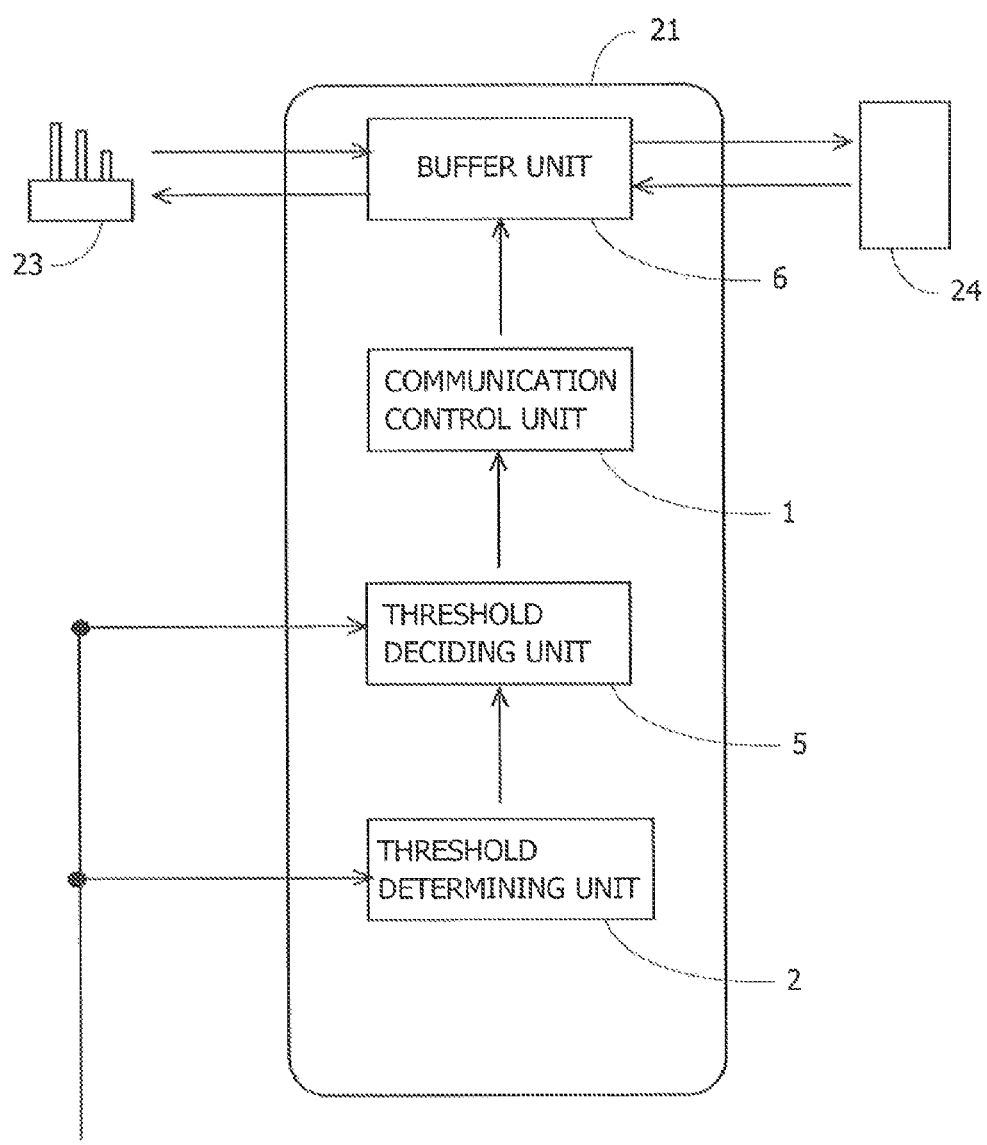
FIG. 4 is a diagram illustrating the configuration of the communication control apparatus in a modification 11.

FIG. 4 is a diagram illustrating the configuration of the communication control apparatus 21 in the modification 11. Note that, in FIG. 4, sections related to the modification 11 are described. In FIG. 4, the communication control apparatus 21 is located between the radio relay apparatus 23 and the server 24. However, the communication control apparatus 21 can be built in the radio relay apparatus 23, the server 24, or the radio communication apparatus. In FIG. 4, as the configuration of the communication control apparatus 21 in the modification 11, the communication control unit 1, a threshold determining unit 2, a threshold deciding unit 5, and the buffer unit 6 are illustrated.

The threshold determining unit 2 determines, on the basis of a past tendency of measured communication quality values, a threshold for deciding a level of the communication quality. The threshold deciding unit 5 performs threshold decision for comparing the present value of the communication quality value and the threshold. The threshold determining unit 2 and the threshold deciding unit 5 may be formed by a processor such as a Central Processing Unit (CPU) executing a computer program on a main storage. The threshold determining unit 2 and the threshold deciding unit 5 may be hardware including a digital circuit and an analog circuit. The other components in the modification 11 are the same as the components in the first embodiment. Therefore, the same components as the components in the first embodiment are denoted by the same reference numerals and explanation of the components is omitted.

In FIG. 4, the present value of the communication quality value is directly input to the threshold deciding unit 5 from the radio communication apparatus. As another method, the present value of the communication quality value may be input to the threshold deciding unit 5 from the radio communication apparatus through the threshold determining unit 2.

Figure 5:
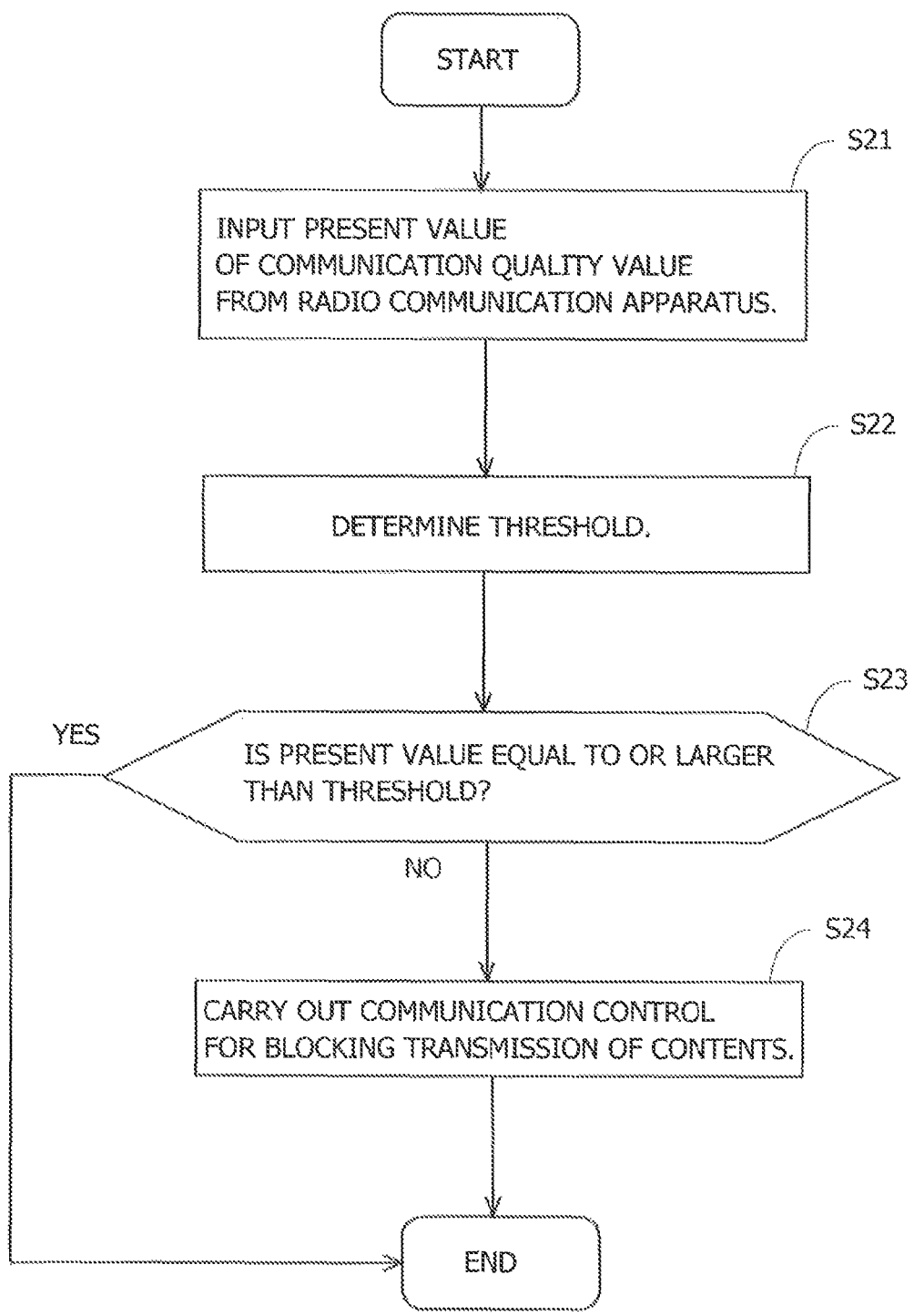
FIG. 5 is a diagram illustrating a flow of communication control of the communication control apparatus in the modification 11.

FIG. 5 is a diagram illustrating a flow of communication control of the communication control apparatus 21 in the modification 11. A flow of processing of the communication control performed by the communication control apparatus 21 in the modification 11 is explained with reference to FIG. 5. The threshold determining unit 2 receives a communication quality value from the radio communication apparatus (S21). The threshold determining unit 2 determines, on the basis of a past tendency of the communication quality value, a threshold for deciding a level of communication quality (S22). The threshold deciding unit 5 performs threshold decision for comparing a present value of the communication quality value input from the radio communication apparatus and a threshold input from the threshold determining unit 2. When the present value of the communication quality value is equal to or larger than the threshold, the communication control unit 1 does not carry out communication control for blocking transmission of contents. When the present value of the communication quality value is smaller than the threshold, the threshold deciding unit 5 advances the processing to S24 (S23). The processing in S24 is the same as S13 in FIG. 2. Therefore, explanation of the processing is omitted.

The communication control apparatus 21 in the modification 11 includes a configuration for performing the threshold decision. As a result, the communication control apparatus 21 in the modification 11 can carry out the communication control disclosed in the present proposal even for a radio communication apparatus not including a mechanism for executing the threshold decision.

<Modification 12>

In the first embodiment, transmission of contents is blocked while the present value of the communication quality value is smaller than the threshold. In a modification 12 explained below, a configuration is illustrated in which timer processing is added to the communication control apparatus 21 in the first embodiment. The timer processing does not allow the communication control for blocking transmission of contents to continue in a period equal to or longer than a predetermined period.

Figure 6:
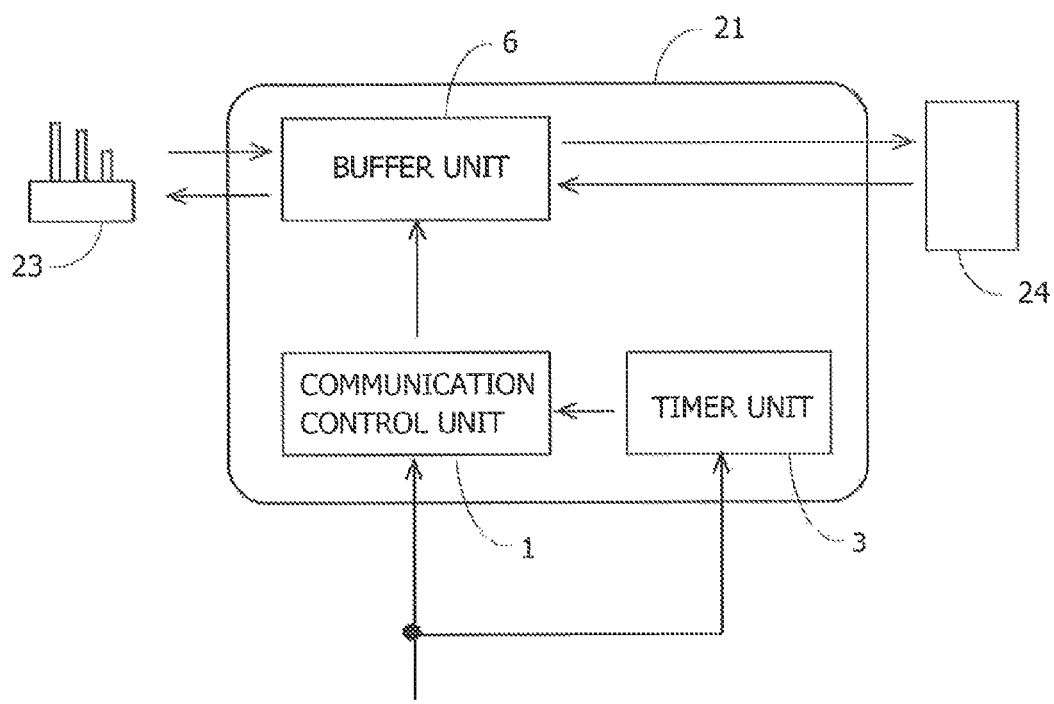
FIG. 6 is a diagram illustrating the configuration of the communication control apparatus in a modification 12.

FIG. 6 is a diagram illustrating the configuration of the communication control apparatus 21 in the modification 12. Note that, in FIG. 6, sections related to the modification 12 are described. In FIG. 6, the communication control apparatus 21 is located between the radio relay apparatus 23 and the server 24. However, the communication control apparatus 21 can be built in the radio relay apparatus 23, the server 24, or the radio communication apparatus. In FIG. 6, as the configuration of the communication control apparatus 21 in the modification 12, the communication control unit 1, a timer unit 3, and the buffer unit 6 are illustrated.

When the present value of the communication quality value is smaller than the threshold continuously longer than a predetermined period, the timer unit 3 performs timer processing for suspending the communication control for blocking transmission of contents. The timer unit 3 may be formed by a processor such as a Central Processing Unit (CPU) executing a computer program on a main storage. The timer unit 3 may be hardware including a digital circuit and an analog circuit. The other components in the modification 12 are the same as the components in the first embodiment. Therefore, the same components as the components in the first embodiment are denoted by the same reference numerals and explanation of the components is omitted.

The predetermined period is illustrated as a period in which the transmission of contents takes too long if the transmission of contents is blocked in a period equal to or longer than the period. Alternatively, the predetermined period may be a period in which the transmission of contents might not be able to be completed if the transmission of contents is blocked in a period equal to or longer than the period.

Figure 7:
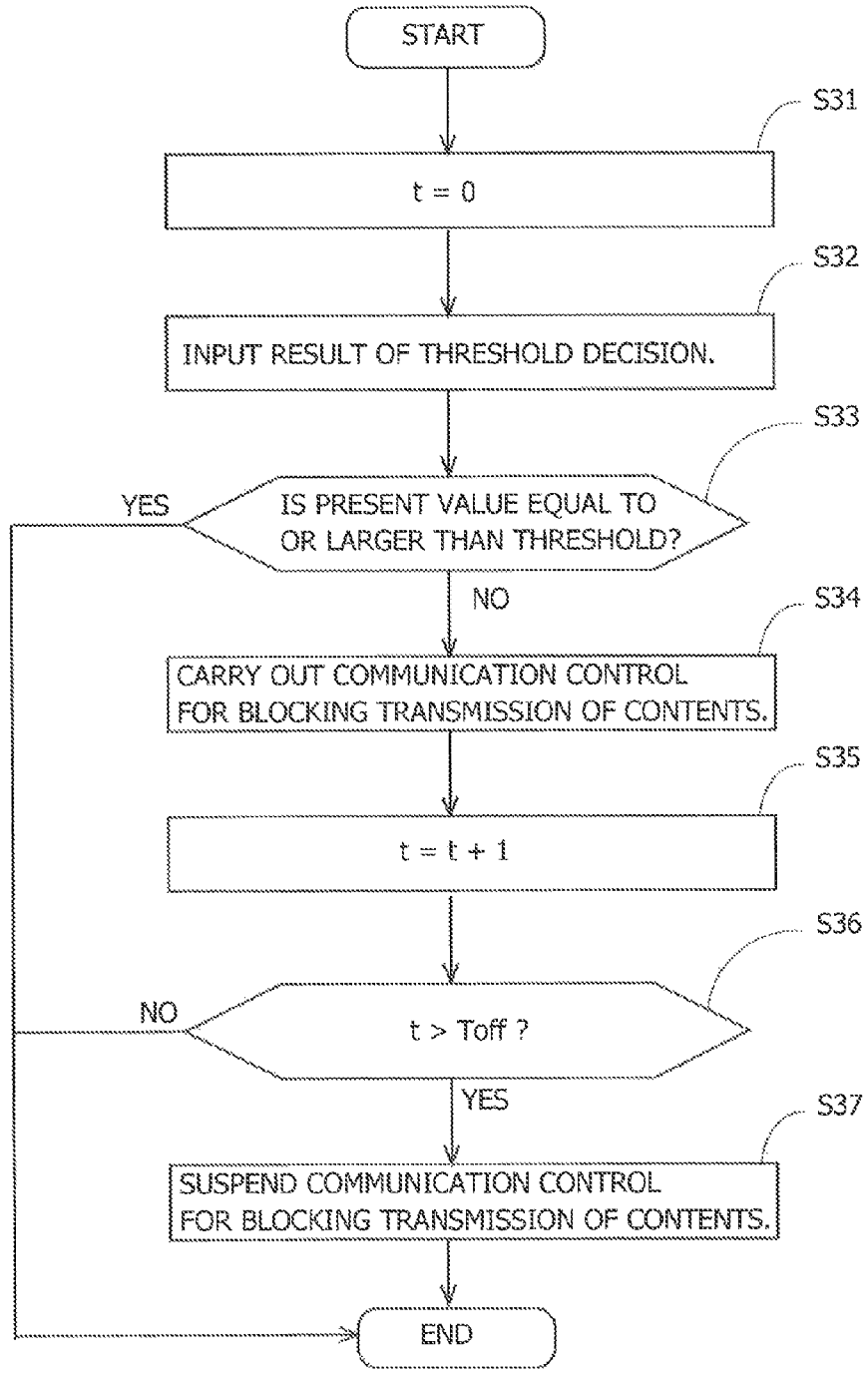
FIG. 7 is a diagram illustrating a communication control flow performed by the communication control apparatus in the modification 12.

FIG. 7 is a diagram illustrating a communication control flow performed by the communication control apparatus 21 in the modification 12. Processing of the communication control apparatus 21 in the modification 12 is explained with reference to FIG. 7. The timer unit 3 initializes a timer value t to 0 (S31). The communication control unit 1 receives a result of threshold decision from the radio communication apparatus (S32). When the present value of the communication quality value is equal to or larger than the threshold, the communication control unit 1 does not block the transmission of contents. When the present value of the communication quality value is smaller than the threshold, the communication control unit 1 advances the processing to S34 (S33). The communication control unit 1 instructs the buffer unit 6 to block transmission of contents (S34). The timer unit 3 increments the timer value t (S35). When the present timer value t is within a predetermined period Toff, the timer unit 3 does not suspend the communication control for blocking transmission of contents. When the present timer value t exceeds the predetermined period Toff, the timer unit 3 advances the processing to S37 (S36). The timer unit 3 instructs the communication control unit 1 to suspend the communication control for blocking transmission of contents. As a result, the communication control unit 1 instructs the buffer unit 6 to suspend the transmission of contents (S36).

The communication control apparatus 21 in the modification 12 performs timer processing for preventing a period for blocking transmission of contents from continuing in a period equal to or longer than a predetermined period. Therefore, the communication control apparatus 21 in the modification 12 can avoid timeout of the transmission of contents. As a result, the communication control apparatus 21 in the modification 12 can improve an event in which the transmission of contents might not be able to be completed.

<Modification 13>

In the communication control apparatus 21 in the modification 12, the result of the threshold decision is input from the radio communication apparatus. In the communication control apparatus 21 in a modification 13 explained below, a configuration is illustrated in which processing of the threshold decision is added to the communication control apparatus 21 in the modification 12. Therefore, the present value of the communication quality value is input to the communication control apparatus 21 in the modification 13 from the radio communication apparatus.

Figure 8:
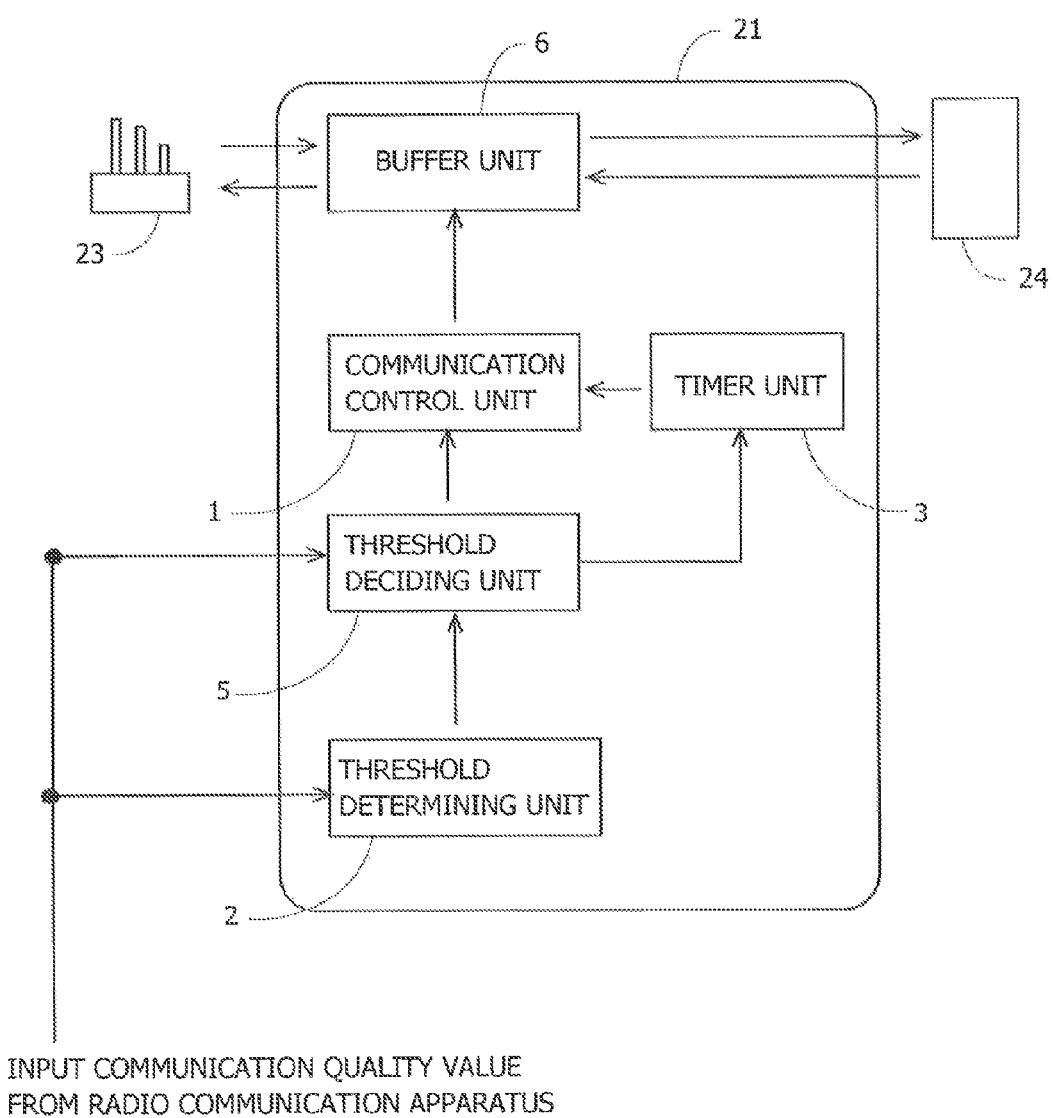
FIG. 8 is a diagram illustrating the configuration of the communication control apparatus in a modification 13.

FIG. 8 is a diagram illustrating the configuration of the communication control apparatus 21 in the modification 13. Note that, in FIG. 8, sections related to the modification 13 are described. In FIG. 8, the communication control apparatus 21 is located between the radio relay apparatus 23 and the server 24. However, the communication control apparatus 21 can be built in the radio relay apparatus 23, the server 24, or the radio communication apparatus. In FIG. 8, as the configuration of the communication control apparatus 21 in the modification 13, the communication control unit 1, the threshold determining unit 2, the timer unit 3, the threshold deciding unit 5, and the buffer unit 6 are illustrated. The components in the modification 13 are the same as the components in the modification 11 and the modification 12. Therefore, the same components as the components in the modification 11 and the modification 12 are denoted by the same reference numerals and explanation of the components is omitted.

In FIG. 8, the present value of the communication quality value is directly input to the threshold deciding unit 5 from the radio communication apparatus. However, the present value of the communication quality value may be input to the threshold deciding unit 5 from the radio communication apparatus through the threshold determining unit 2.

Figure 9:
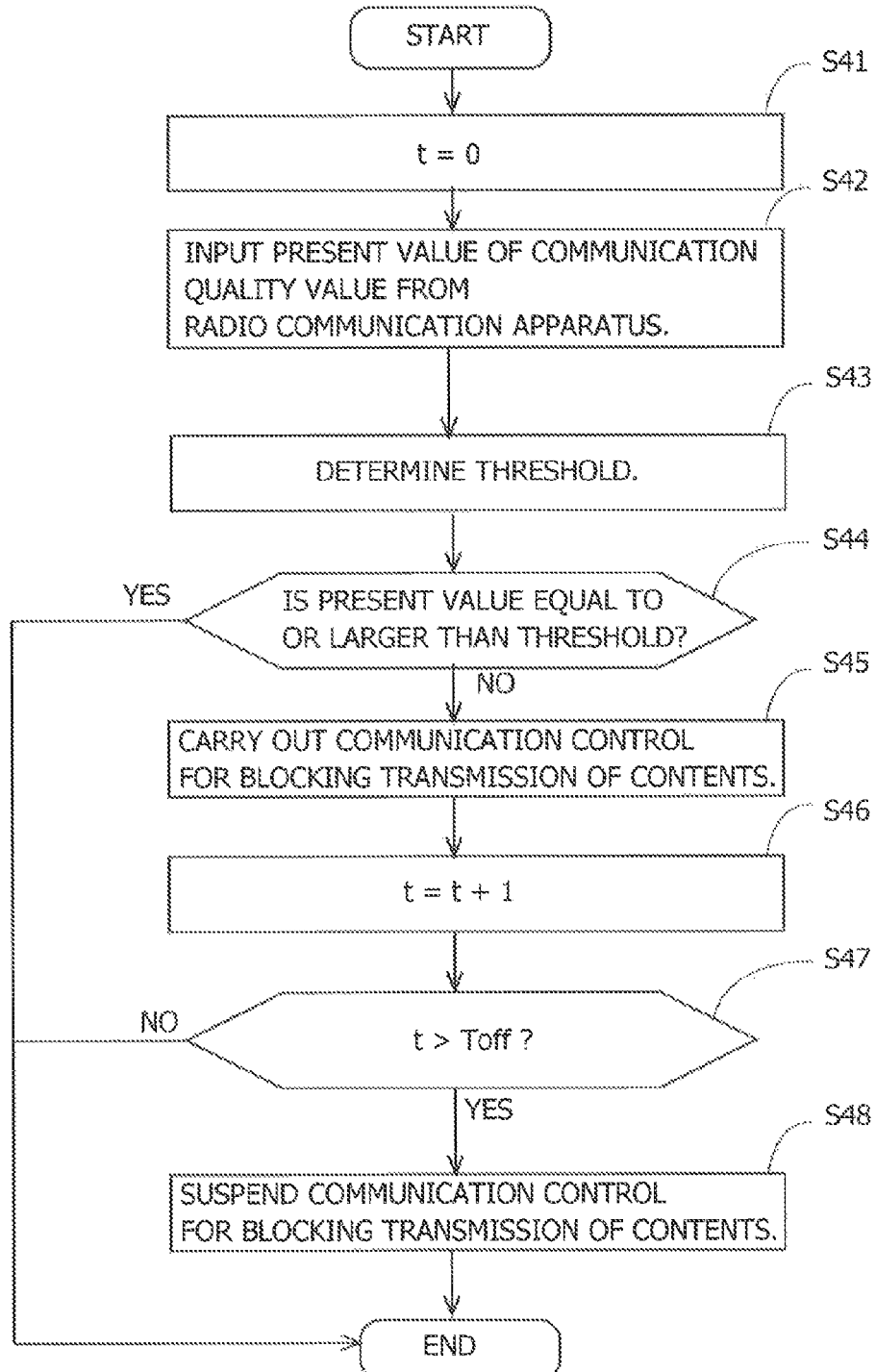
FIG. 9 is a diagram illustrating a communication control flow performed by the communication control apparatus in the modification 13.

FIG. 9 is a diagram illustrating a communication control flow performed by the communication control apparatus 21 in the modification 13. Processing of the communication control in the modification 13 is explained with reference to FIG. 9. The timer unit 3 initializes the timer value t to 0 (S41). The threshold determining unit 2 receives a communication quality value from the radio communication apparatus (S42). The threshold determining unit 2 determines, on the basis of a past tendency of the communication quality value, a threshold for deciding a level of communication quality (S43). The threshold deciding unit 5 performs threshold decision for comparing a present value of the communication quality value input from the radio communication apparatus and the threshold input from the threshold determining unit 2 (S44). Processing in S44 to S48 after the threshold decision is performed is the same as S33 to S37 in FIG. 7. Therefore, details of the processing are omitted.

The communication control apparatus 21 in the modification 13 includes a configuration for performing the threshold decision. As a result, the communication control apparatus 21 in the modification 13 can carry out the communication control in the modification 12 even for a radio communication apparatus not including a mechanism for executing the threshold decision.

<Modification 14>

The communication control apparatus 21 in the first embodiment blocks transmission of contents if the present value of the communication quality value is smaller than the threshold. In the communication control apparatus 21 in a modification 14 explained below, a configuration is illustrated in which processing for monitoring communication quality is added to the communication control apparatus 21 in the first embodiment. The processing for monitoring communication quality suppresses control for blocking transmission of contents when it is predicted that transmission of contents is blocked in a period equal to or longer than a predetermined period if the threshold decision is performed.

Figure 10:
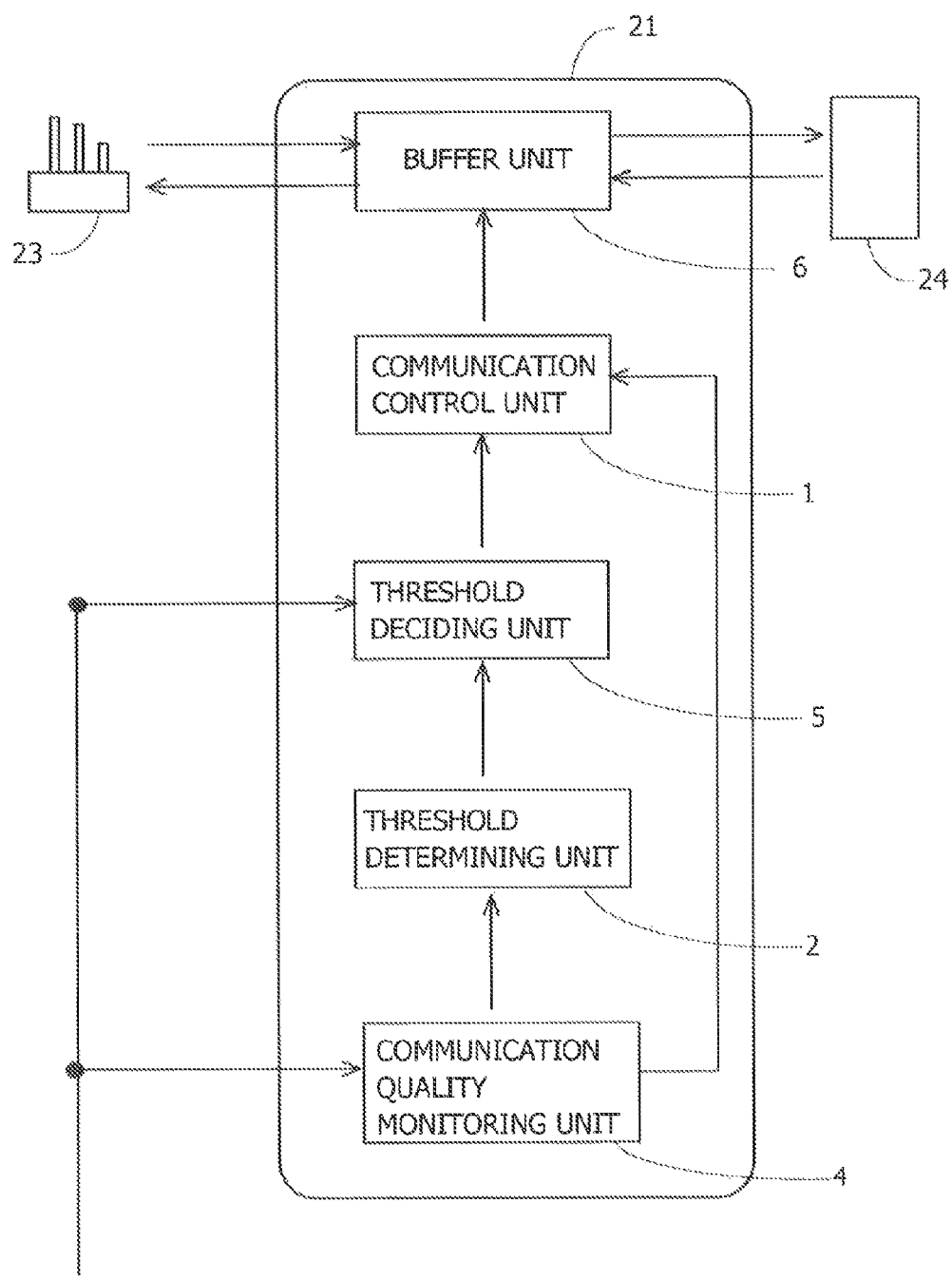
FIG. 10 is a diagram illustrating the configuration of the communication control apparatus in a modification 14.

FIG. 10 is a diagram illustrating the configuration of the communication control apparatus 21 in the modification 14. Note that, in FIG. 10, sections related to the modification 14 are described. In FIG. 10, the communication control apparatus 21 is located between the radio relay apparatus 23 and the server 24. However, the communication control apparatus 21 can be built in the radio relay apparatus 23, the server 24, or the radio communication apparatus. In FIG. 10, as the configuration of the communication control apparatus 21 in the modification 14, the communication control unit 1, the threshold determining unit 2, a communication quality monitoring unit 4, the threshold deciding unit 5, and the buffer unit 6 are illustrated.

The communication quality monitoring unit 4 monitors communication quality of the radio communication apparatus. When it is predicted that transmission of contents is blocked in a period equal to or longer than a predetermined period if threshold decision is performed, the communication quality monitoring unit 4 instructs the communication control unit 1 to suspend communication control for blocking transmission of contents. The communication quality monitoring unit 4 may be formed by a processor such as a Central Processing Unit (CPU) executing a computer program on a main storage. The communication quality monitoring unit 4 may be hardware including a digital circuit and an analog circuit. The other components in the modification 14 are the same as the components in the modification 11. Therefore, the same components as the components in the modification 11 are denoted by the same reference numeral and explanation of the components is omitted.

The transmission of contents is blocked in a period equal to or longer than the predetermined period if the threshold decision is performed, for example, when a present value of a communication quality value is smaller than the threshold and the communication quality value tends to decrease.

As a method of monitoring communication quality, a method of managing a communication quality value and time when the communication quality value is measured in association with each other is illustrated. Alternatively, the method of monitoring communication quality may be a method of, for example, managing length of a period in which a value obtained by differentiating a communication quality value with time is continuously negative.

In FIG. 10, the present value of the communication quality value is directly input to the threshold deciding unit 5 from the radio communication apparatus. However, the present value of the communication quality value may be input to the threshold deciding unit 5 from the radio communication apparatus through the communication quality monitoring unit 4 and the threshold determining unit 2.

Figure 11:
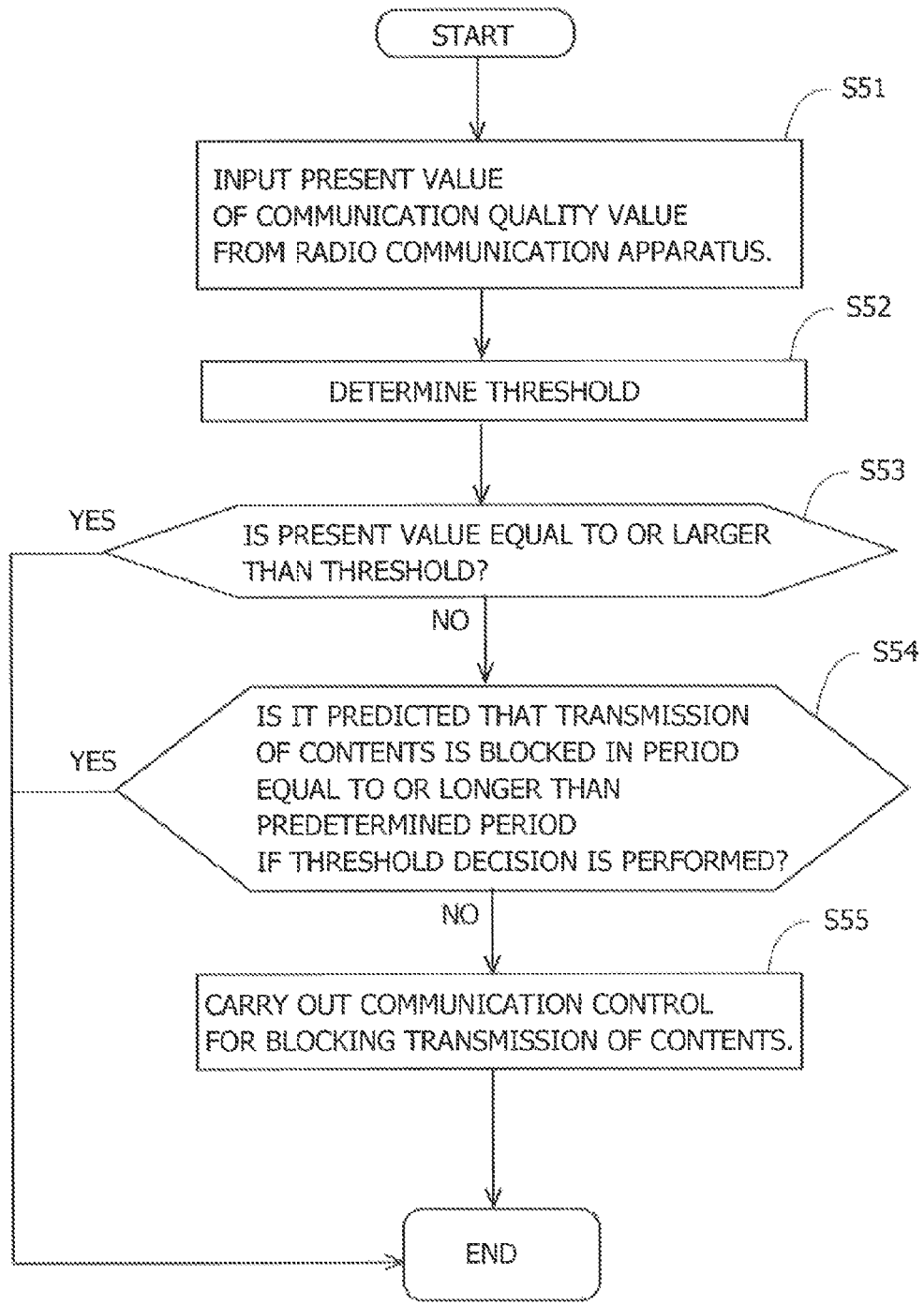
FIG. 11 is a diagram illustrating a communication control flow performed by the communication control apparatus in the modification 14.

FIG. 11 is a diagram illustrating a communication control flow performed by the communication control apparatus 21 in the modification 14. A flow of processing of communication control in the modification 14 is explained with reference to FIG. 11. The communication quality monitoring unit 4 receives a present value of a communication quality value from the radio communication apparatus (S51). The threshold determining unit 2 determines, on the basis of a past tendency of the communication quality value, a threshold for deciding a level of communication quality (S52). The threshold deciding unit 5 performs threshold decision for comparing the present value of the communication quality value input from the radio communication apparatus and the threshold input from the threshold determining unit 2. When the present value of the communication quality value is equal to or larger than the threshold, the communication control unit 1 does not block the transmission of contents. When the present value of the communication quality value is smaller than the threshold, the threshold deciding unit 5 advances the processing to S54 (S53). The communication quality monitoring unit 4 determines whether it is predicted that the transmission of contents is blocked in a period equal to or longer than a predetermined period if threshold decision is performed. When it is predicted that the transmission of contents is blocked in a period equal to or longer than the predetermined period if the threshold decision is performed, the communication control unit 1 does not block the transmission of contents. Otherwise, the communication quality monitoring unit 4 advances the processing to S55 (S54). The communication control unit 1 instructs the buffer unit 6 to block the transmission of contents (S55).

The communication control apparatus 21 in the modification 14 does not block the transmission of contents when it is predicted that the transmission of contents is blocked in a period equal to or longer than the predetermined period if the threshold decision is performed. As a result, the communication control apparatus 21 in the modification 14 can improve an event in which the transmission of contents does not start.

<Modification 15>

The communication control apparatus 21 in the modification 11 performs the communication control on the basis of the result of the threshold decision input from the outside of the communication control apparatus 21. In a modification 15 explained below, a radio communication apparatus that carries out threshold decision and communication control is illustrated.

Figure 12:
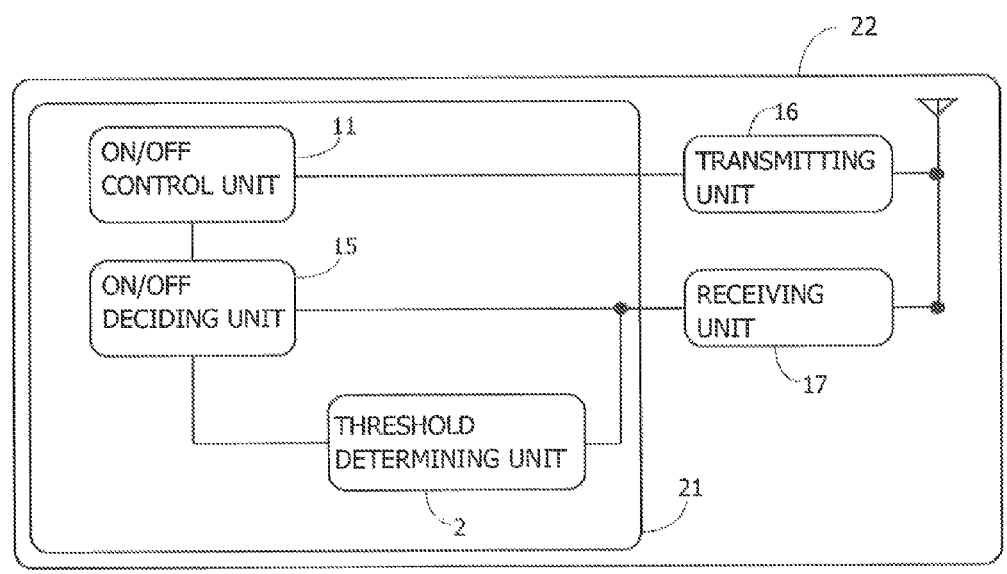
FIG. 12 is a diagram illustrating the configuration of a radio communication apparatus in a modification 15.

FIG. 12 is a diagram illustrating the configuration of a radio communication apparatus 22 in the modification 15. Note that, in FIG. 12, sections related to the modification 15 are described. In FIG. 12, as the configuration of the radio apparatus 22 in the modification 15, the communication control apparatus 21 in the modification 11, a transmitting unit 16, and a receiving unit 17 are illustrated. In FIG. 12, as the configuration of the communication control apparatus 21 in the modification 11, an ON/OFF control unit 11, the threshold determining unit 2, and an ON/OFF deciding unit 15 are illustrated.

The ON/OFF control unit 11 is an illustration of the communication control unit 1 explained above. The ON/OFF deciding unit 15 is an illustration of the threshold deciding unit 5 explained above. The transmitting unit 16 transmits a result of threshold decision executed by the radio communication apparatus 22 to the communication control apparatus 21. The receiving unit 17 measures a communication quality value indicating communication quality between the radio communication apparatus 22 and the radio relay apparatus 23. The transmitting unit 16 and the receiving unit 17 may be formed by a processor such as a Central Processing Unit (CPU) executing a computer program on a main storage. The transmitting unit 16 and the receiving unit 17 may be hardware including a digital circuit and an analog circuit. The other components in the modification 15 are the same as the components in the modification 11 . Therefore, the same components as the components in the modification 11 are denoted by the same reference numerals and explanation of the components is omitted.

In FIG. 12, a present value of the communication quality value is directly input to the ON/OFF deciding unit 15 from the receiving unit 17. However, the present value of the communication quality value may be input to the ON/OFF deciding unit 15 from the receiving unit 17 through the threshold determining unit 2.

In FIG. 12, the ON/OFF control unit 11 notifies a server (not illustrated in the figure) of blocking of transmission of contents via the transmitting unit 16. However, the ON/OFF control unit 11 can also control the transmitting unit 16 or the receiving unit 17 to block the transmission of contents.

A flow of processing of the communication control in the modification 15 after the threshold calculating unit 12 and the ON/OFF deciding unit 15 receive, as an input, the communication quality value measured by the receiving unit 17 is the same as the flow of the processing in the modification 11.

The radio communication apparatus 22 in the modification 15 includes a mechanism for performing communication control. As a result, the radio communication apparatus 22 in the modification 15 can carry out the communication control disclosed in the present proposal even if the communication control apparatus 21 is not set in the radio relay apparatus 23 or the server 24.

<Modification 16>

The communication control apparatus 21 in the modification 13 performs the communication control on the basis of the result of the threshold decision input from the outside of the communication control apparatus 21. In a modification 16 explained below, the radio communication apparatus 22 that carries out threshold decision, timer processing, and communication control is illustrated.

Figure 13A:
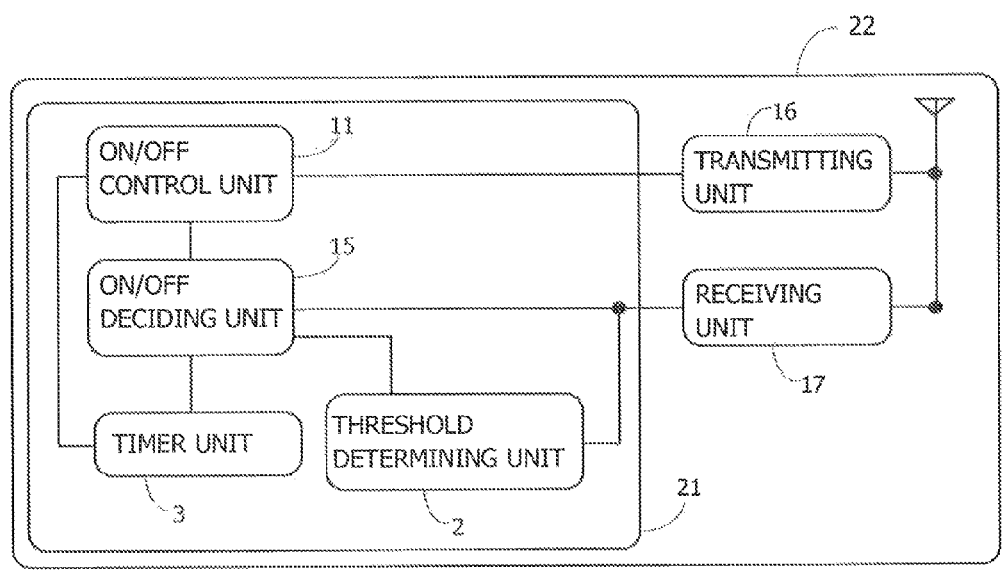
FIG. 13A is a diagram illustrating the configuration of the radio communication apparatus in a modification 16.

FIG. 13A is a diagram illustrating the configuration of the radio communication apparatus 22 in the modification 16. Note that, in FIG. 13A, sections related to the modification 16 are described. In FIG. 13A, as the configuration of the radio communication apparatus 22 in the modification 16, the communication control apparatus 21 in the modification 13, the transmitting unit 16, and the receiving unit 17 are illustrated. In FIG. 13A, as the configuration of the communication control apparatus 21 in the modification 13, the ON/OFF control unit 11, the threshold determining unit 2, the timer unit 3, and the ON/OFF deciding unit 15 are illustrated. The components in the modification 16 are the same as the components in the modification 13 or the modification 15. Therefore, the same components as the components in the modification 13 or the modification 15 are denoted by the same reference numerals and explanation of the components is omitted.

In FIG. 13A, a present value of a communication quality value is directly input to the ON/OFF deciding unit 15 from the receiving unit 17. However, the present value of the communication quality value may be input to the ON/OFF deciding unit 15 from the receiving unit 17 through the threshold determining unit 2.

In FIG. 13A, the ON/OFF control unit 11 notifies a server (not illustrated in the figure) of blocking of transmission of contents via the transmitting unit 16. However, the ON/OFF control unit 11 can also control the transmitting unit 16 or the receiving unit 17 to block the transmission of contents.

Figure 13B:
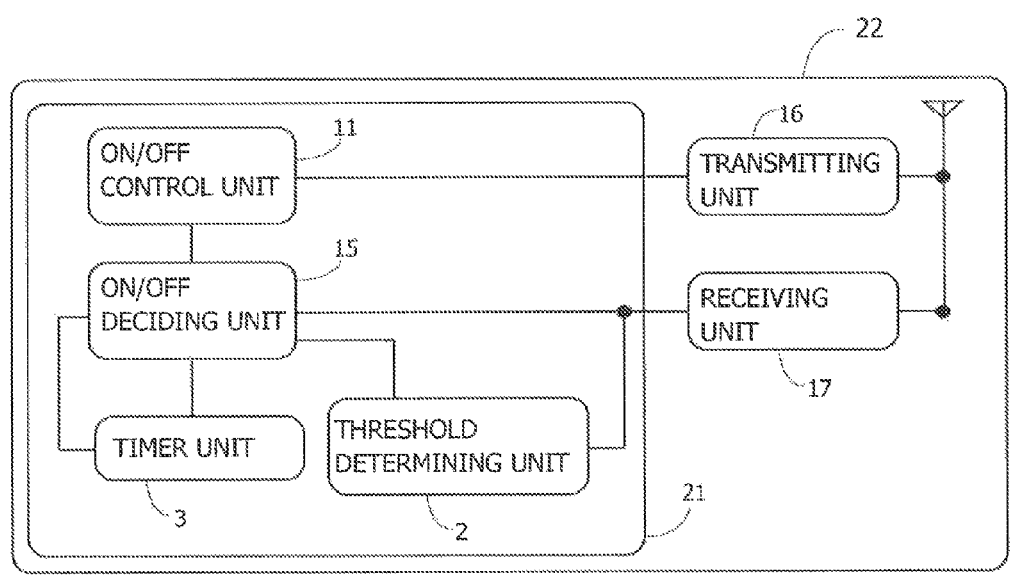
FIG. 13B is a diagram illustrating a configuration for connecting a timer unit to an ON/OFF control unit in the radio communication apparatus in the modification 16.

In FIG. 13A, the timer unit 3 is connected to the ON/OFF control unit 11. However, timer processing by the timer unit 3 is not limited to this configuration. For example, as illustrated in FIG. 13B, the timer unit 3 can also be connected to the ON/OFF deciding unit 15. In the case of the configuration illustrated in FIG. 13B, processing for suspending communication control in which the timer unit 3 blocks transmission of contents is illustrated by, for example, a method explained below. The timer unit 3 instructs the ON/OFF deciding unit 15 to output a result of threshold decision indicating that the present value of the communication quality value is equal to or larger than a threshold. As a result, since the present communication quality value is equal to or larger than the threshold in the threshold decision, the ON/OFF control unit 11 suspends the communication control for blocking transmission of contents.

A flow of processing of the communication control in the modification 16 after the threshold calculating unit 12 and the ON/OFF deciding unit 15 receive, as an input, the communication quality value measured by the receiving unit 17 is the same as the flow of the processing in the modification 13.

The radio communication apparatus 22 in the modification 16 performs timer processing for not continuing a period for blocking transmission of contents in a period equal to or longer than a predetermined period. Therefore, the radio communication apparatus 22 in the modification 16 can avoid timeout of transmission of contents. As a result, the radio communication apparatus 22 in the modification 16 can improve an event in which the transmission of contents might not be completed.

<Modification 17>

The communication control apparatus 21 in the modification 14 performs the communication control on the basis of the result of the threshold decision input from the outside of the communication control apparatus 21. In a modification 17 explained below, the radio communication apparatus 22 that carries out threshold decision, communication quality monitoring, and communication control is illustrated.

Figure 14A:
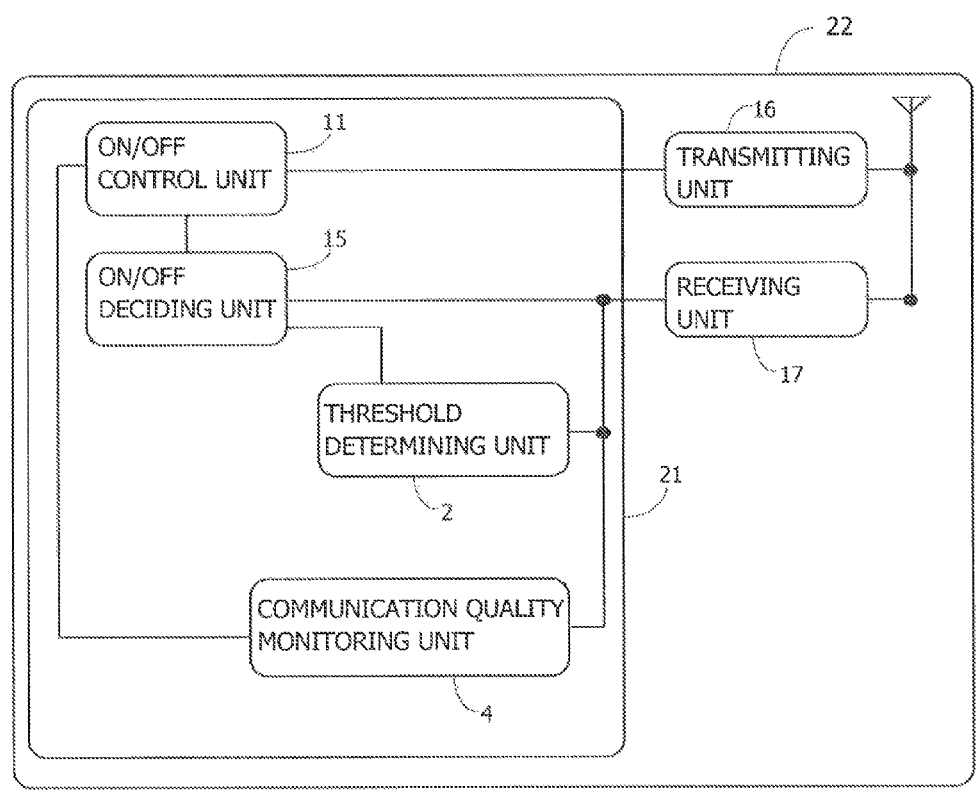
FIG. 14A is a diagram illustrating the configuration of the radio communication apparatus in a modification 17.

FIG. 14A is a diagram illustrating the configuration of the radio communication apparatus 22 in the modification 17. Note that, in FIG. 14A, sections related to the modification 17 are described. In FIG. 14A, as the configuration of the radio communication apparatus 22 in the modification 17, the communication control apparatus 21 in the modification 14, the transmitting unit 16, and the receiving unit 17 are illustrated. In FIG. 14A, as the configuration of the communication control apparatus 21 in the modification 14, the ON/OFF control unit 11, the threshold determining unit 2, the communication quality monitoring unit 4, and the ON/OFF deciding unit 15 are illustrated. The components in the modification 17 are the same as the components in the modification 14 or the modification 15. Therefore, the same components as the components in the modification 14 or the modification 15 are denoted by the same reference numerals and explanation of the components is omitted.

In FIG. 14A, a present value of a communication quality value is directly input to the ON/OFF deciding unit 15 from the receiving unit 17. However, the present value of the communication quality value may be input to the ON/OFF deciding unit 15 from the receiving unit 17 through the threshold determining unit 2.

In FIG. 14A, the ON/OFF control unit 11 can notify a server (not illustrated in the figure) of blocking of transmission of contents via the transmitting unit 16. However, the ON/OFF control unit 11 can also control the transmitting unit 16 or the receiving unit 17 to block the transmission of contents.

Figure 14B:
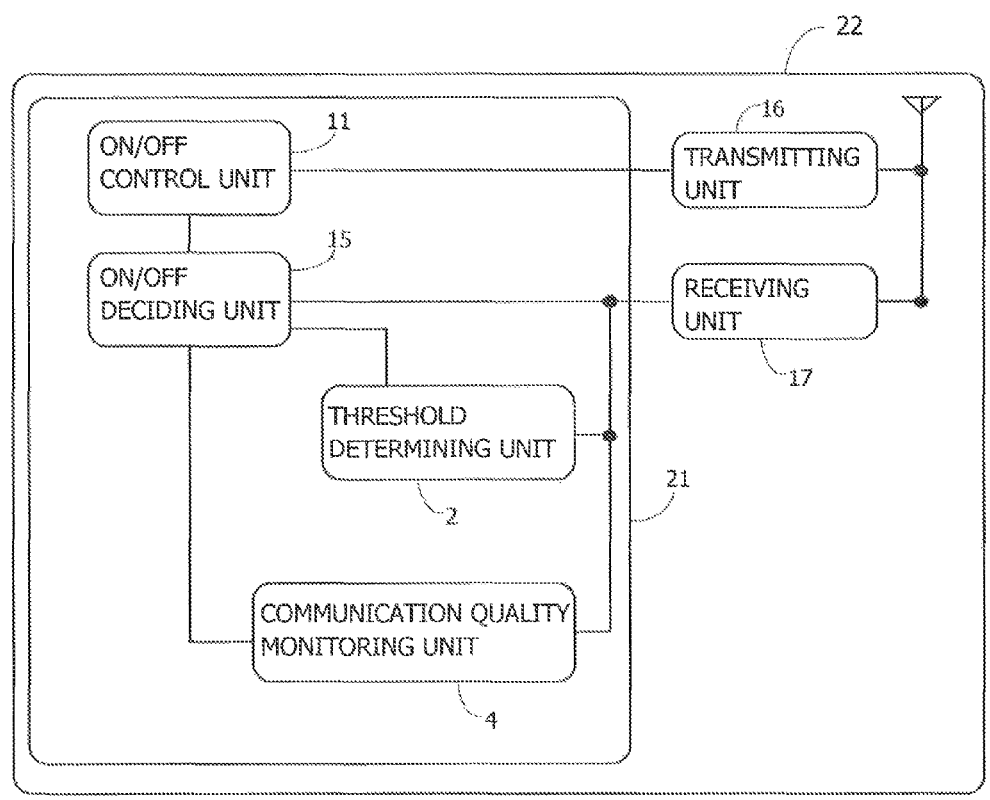
FIG. 14B is a diagram illustrating a configuration for connecting a communication quality monitoring unit to an ON/OFF control unit in the radio communication apparatus in the modification 17.

In FIG. 14, the communication quality monitoring unit 4 is connected to the ON/OFF control unit 11. However, monitoring of communication quality by the communication quality monitoring unit 4 is not limited to this configuration. For example, as illustrated in FIG. 14B, the communication quality monitoring unit 4 can also be connected to the ON/OFF deciding unit 15. In the case of the configuration illustrated in FIG. 14B, processing for suspending communication control in which the communication quality monitoring unit 4 blocks transmission of contents is illustrated by, for example, a method explained below. The communication quality monitoring unit 4 instructs the ON/OFF deciding unit 15 to output a result of threshold decision indicating that the present value of the communication quality value is equal to or larger than a threshold. As a result, since the present communication quality value is equal to or larger than the threshold in the threshold decision, the ON/OFF control unit 11 suspends the communication control for blocking transmission of contents.

A flow of processing of the communication control after the threshold calculating unit 12, the communication quality monitoring unit 4, and the ON/OFF deciding unit 15 receive, as an input, the communication quality value measured by the receiving unit 17 is the same as the flow of the processing in the modification 14.

The radio communication apparatus 22 in the modification 17 does not block the transmission of contents when it is predicted that the transmission of contents is blocked in a period equal to or longer than the predetermined period if the threshold decision is performed. As a result, the radio communication apparatus 22 in the modification 17 can improve an event in which the transmission of contents does not start.

<Application Example 1>

Figure 15A:
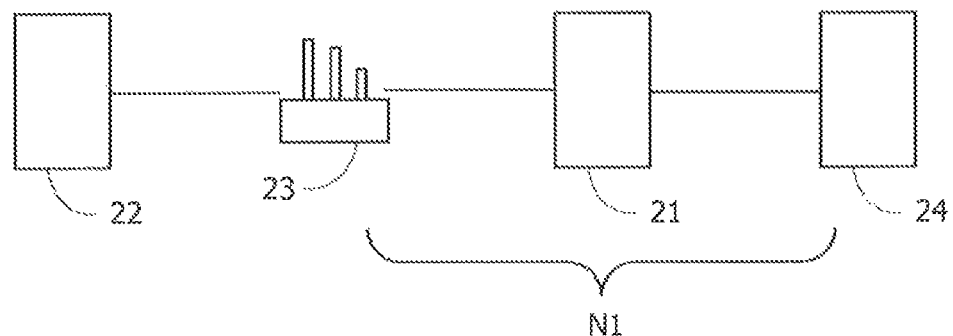
FIG. 15A is a diagram illustrating a communication system in which a communication control apparatus is provided between a radio relay apparatus and a server.

In FIG. 15A, an application example of the communication control apparatus 21 illustrated in the first embodiment and the modifications 11 to 17 to a communication system is illustrated. FIG. 15A is a diagram illustrating a communication system in which the communication control apparatus 21 is provided between the radio relay apparatus 23 and the server 24. In FIG. 15A, the radio relay apparatus 23, the communication control apparatus 21, and the server 24 are connected by a core network N1. However, the connection among the radio relay apparatus 23, the communication control apparatus 21, and the server 24 is not limited to the core network N1. The radio relay apparatus 23, the communication control apparatus 21, and the server 24 may be connected by a LAN or may be connected by a bus of a computer. In the case of the communication system illustrated in FIG. 15A, the communication control apparatus 21 is typically a proxy server. The communication control apparatus 21 can simply retain information for identifying the radio communication apparatus 22, which is a communication destination of the server 24, and a result of threshold decision. However, the communication control apparatus 21 may retain information for identifying the radio communication apparatus 22 and a threshold. The communication control apparatus 21 may determine, at every transmission and reception of a packet addressed to the radio communication apparatus 22, whether a present value of a communication quality value is equal to or larger than the threshold. The communication control apparatus 21 can simply block a packet of the core network N1, for example, in an application layer of an OSI reference model. For example, the communication control apparatus 21 can simply retain a result of threshold decision of the radio communication apparatus 22 together with a combination of an IP address and a port number of the radio communication apparatus 22 that communicates with the server 24. When a present value of a communication quality value of the radio communication apparatus 22 specified by the IP address and the port number is smaller than the threshold, the communication control apparatus 21 can simply block communication, a transmission destination or a transmission source of which is the radio communication apparatus 22. The combination of the IP address and the port number is an illustration of information for identifying the radio communication apparatus 22. However, the communication system illustrated in FIG. 15A may perform the control in a network layer of the OSI reference model. That is, the communication control apparatus 21 can simply retain a result of the threshold decision of the radio communication apparatus 22 together with an IP address of the radio communication apparatus 22 that communicates with the server 24. When a present value of a communication quality value of the radio communication apparatus 22 specified by the IP address is smaller than the threshold, the communication control apparatus 21 can simply block communication, a transmission destination or a transmission source of which is the IP address. The IP address is an illustration of the information for identifying the radio communication apparatus 22. Note that the communication control explained above can also be applied to a communication system in which the communication control apparatus 21 is provided between the radio relay apparatus 23 and the radio communication apparatus 22.

<Application Example 2>

Figure 15B:
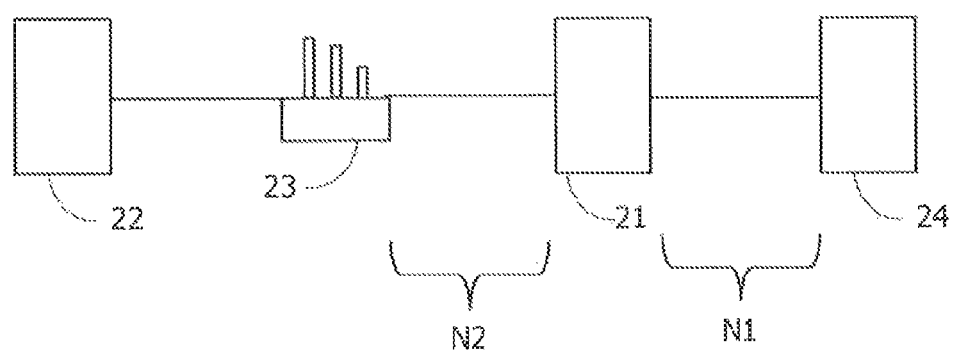
FIG. 15B is a diagram illustrating a communication system in which a communication control apparatus is built in a radio relay apparatus.

FIG. 15B is a diagram illustrating a communication system in which the communication control apparatus 21 is built in the radio relay apparatus 23. The communication control apparatus 21 and the radio relay apparatus 23 are connected by a network N2 such as a LAN, a bus of a computer, or a dedicated network of a computer manufacturer. The communication control apparatus 21 and the server 24 are connected by, for example, the core network N1. The communication control apparatus 21 can simply retain a subscriber peculiar ID of the radio communication apparatus 22 and a result of threshold decision. When a present value of a communication quality of the radio communication apparatus 22 specified by the subscriber peculiar ID is smaller than the threshold, the communication control apparatus 21 can simply block communication, a transmission destination or a transmission source of which is the radio communication apparatus 22. The subscriber peculiar ID is an illustration of the information for identifying the radio communication apparatus 22. However, terminal identification information of the radio communication apparatus 22 may be used instead of the subscriber peculiar ID. The terminal identification information is information with which the radio relay apparatus 23 such as a base station uniquely identifies the radio communication apparatus 22 such as a cellular phone in a cell region. When the radio communication apparatus 22 and the radio relay apparatus 23 form an IP network, the communication control apparatus 21 may retain an IP address of the radio communication apparatus 22 and the result of the threshold decision. In this case, the communication control apparatus 21 can simply carry out the communication control in the network layer explained above.

<Application Example 3>

Figure 15C:
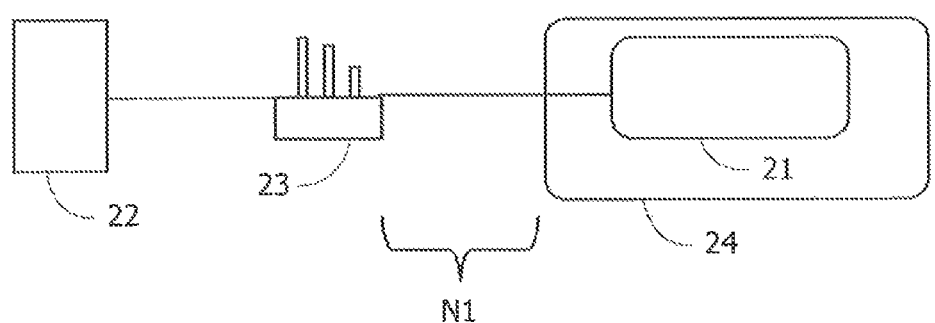
FIG. 15C is a diagram illustrating a communication system in which a communication apparatus is built in a server.

FIG. 15C is a diagram illustrating a communication system in which the communication control apparatus 21 is built in the server 24. The communication control apparatus 21 and the server 24 are connected by, for example, a bus of a computer. Alternatively, the communication control apparatus 21 may be installed in the server 24 as a computer program. The communication control apparatus 21 can carry out the communication control in the application layer or the communication control in the network layer explained above.

<Application Example 4>

Figure 15D:
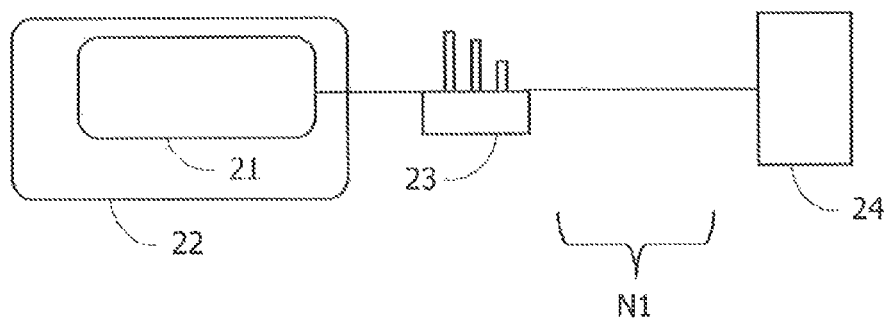
FIG. 15D is a diagram illustrating a communication system in which a communication control apparatus is built in a radio communication apparatus.

FIG. 15D is a diagram illustrating a communication system in which the communication control apparatus 21 is built in the radio communication apparatus 22. The communication control apparatus 21 and the radio communication apparatus 22 are connected by a bus of a computer, for example. Alternatively, the communication control apparatus 21 may be installed in the radio communication apparatus 22 as a computer program. When the communication control apparatus 21 is built in the radio communication apparatus 22, the communication control apparatus 21 can simply retain a result of threshold decision of the radio communication apparatus 22 together with, for example, a combination of an IP address and a port number of a server. In this case, the communication apparatus 21 can simply carry out the communication control in the application layer explained above. The communication control apparatus 21 may retain the result of the threshold decision of the radio communication apparatus 22 together with, for example, an IP address of the server 24. In this case, the communication control apparatus 21 can simply carry out the communication control in the network layer explained above. The communication control apparatus 21 may retain the result of the threshold decision. In this case, the communication control apparatus 21 can simply block transmission of contents of the radio communication apparatus 22 while a present value of a communication quality value of the radio communication apparatus 22 is smaller than the threshold. The communication control apparatus 21 can carry out the blocking of transmission of contents in both of the application layer and the network layer.

<Comparison of the Communication Controls Disclosed Above>

Figure 16A:
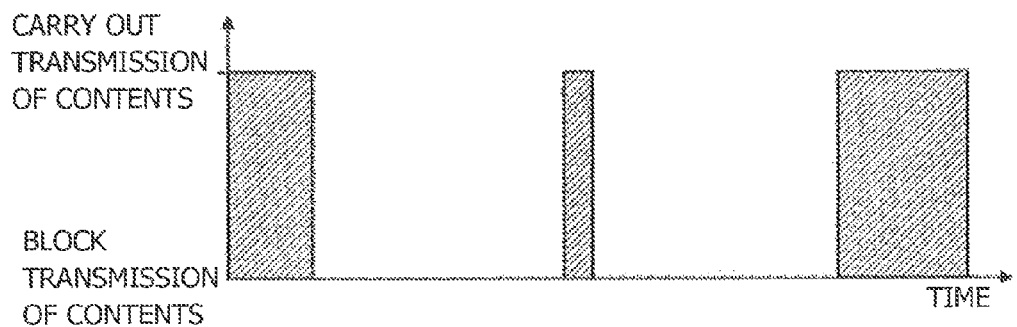
FIG. 16A is a diagram illustrating communication control for blocking transmission of contents when a present value of a communication quality value is smaller than a threshold.
Figure 16B:
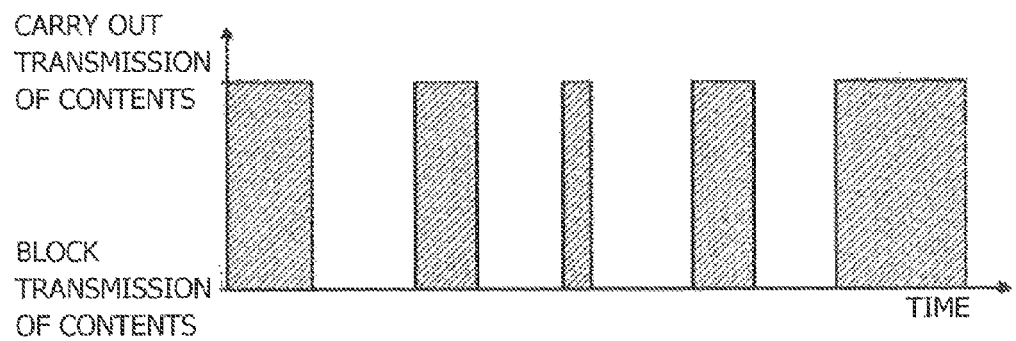
FIG. 16B is a diagram illustrating communication control added with timer processing.
Figure 16C:
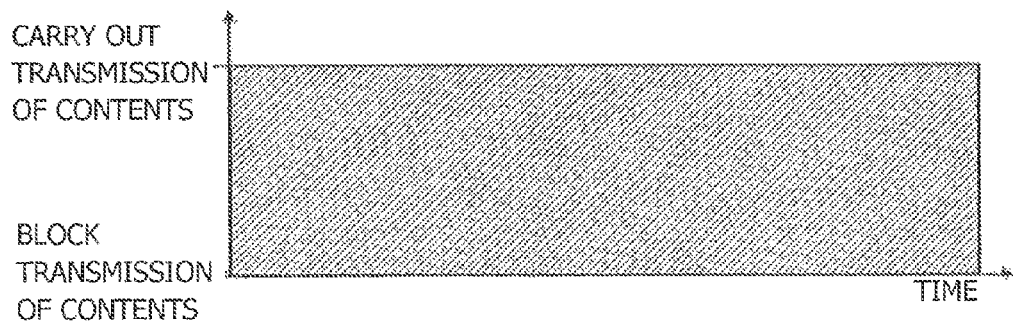
FIG. 16C is a diagram illustrating communication control added with processing for monitoring communication quality.

The kinds of communication control processing of the communication control apparatus 21 in the embodiments and the modifications disclosed above are compared. FIG. 16A is a diagram illustrating the communication control for blocking transmission of contents when a present value of a communication quality value is smaller than the threshold. The embodiments in which the communication control is performed include the first embodiment, the modification 11, and the modification 15. FIG. 16B is a diagram illustrating the communication control added with the timer processing. The embodiments in which the timer processing is added include the modification 12, the modification 13, and the modification 16. The communication control apparatus 21 added with the timer processing does not block transmission of content in a period longer than the predetermined period. As a result, in FIG. 16B, a period in which the transmission of contents is blocked is further reduced than the case illustrated in FIG. 16A. FIG. 16C is a diagram illustrating the communication control added with the processing for monitoring communication quality. The embodiments in which the processing for monitoring communication quality is added include the modification 14 and the modification 17. In FIG. 16C, the transmission of contents is not blocked when it is predicted that the transmission of contents is blocked in a period equal to or longer than the predetermined period if the threshold decision is performed. As a result, in FIG. 16A or FIG. 16B, even in a period in which the transmission of contents is blocked, the transmission of contents is performed in the communication control illustrated in FIG. 16C.

<<Second Embodiment>>

In the first embodiment, the communication control apparatus 21 is illustrated that obtains information for the communication control and carries out the communication control. In a second embodiment, the radio communication apparatus 22 is illustrated that transmits a result of threshold decision to a communication control apparatus. As the communication control apparatus that receives a result of the threshold decision from the radio communication apparatus 22 in the second embodiment, for example, the communication control apparatus 21 in the first embodiment is conceivable.

Figure 17:
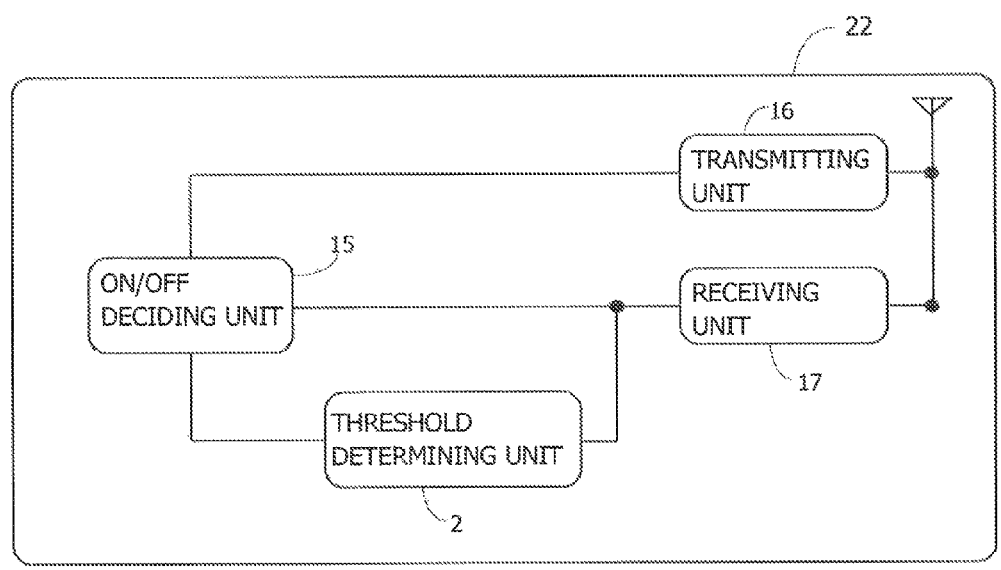
FIG. 17 is a diagram illustrating the configuration of a radio communication apparatus in a second embodiment.

FIG. 17 is a diagram illustrating the configuration of the radio communication apparatus 22 in the second embodiment. Note that, in FIG. 17, sections related to the second embodiment are described. In FIG. 17, as the configuration of the radio communication apparatus 22 in the second embodiment, the threshold determining unit 2, the ON/OFF deciding unit 15, the transmitting unit 16, and the receiving unit 17 are illustrated. The components in the second embodiment are the same as the components in the modification 15. Therefore, the same components as the components in the modification 15 are denoted by the same reference numerals and explanation of the components is omitted.

In FIG. 17, a present value of a communication quality value is directly input to the ON/OFF deciding unit 15 from the receiving unit 17. However, the present value of the communication quality value may be input to the ON/OFF deciding unit 15 from the receiving unit 17 through the threshold determining unit 2.

Figure 18:
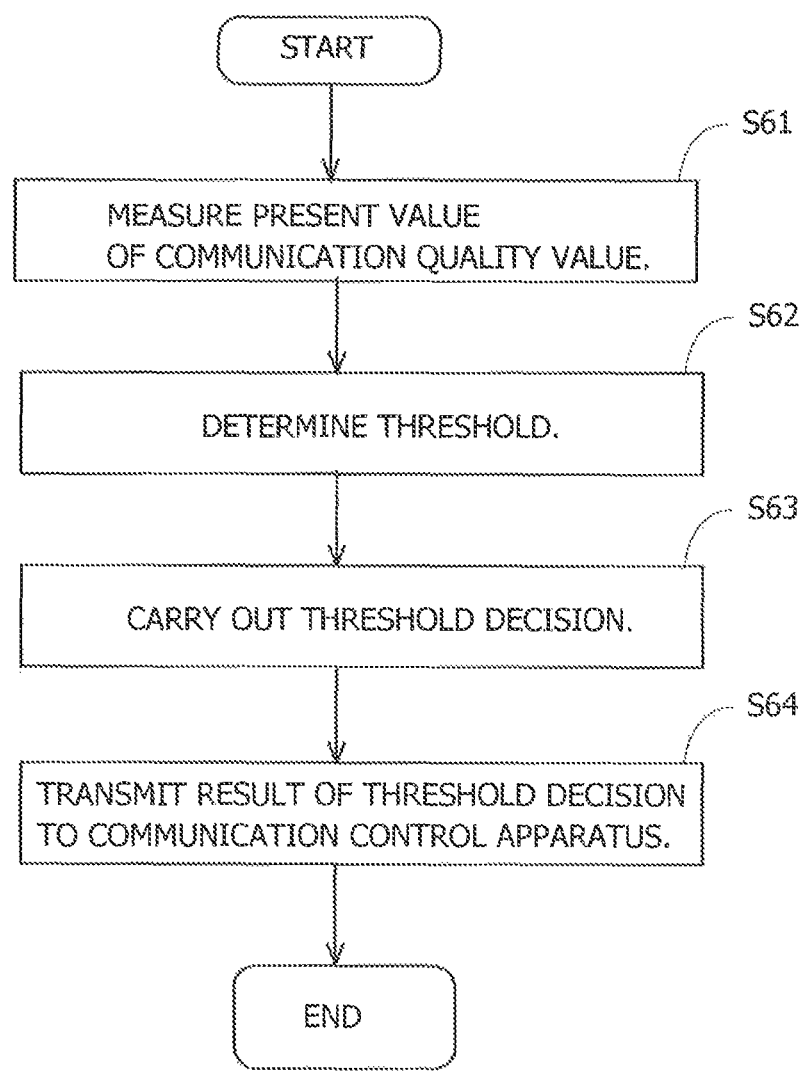
FIG. 18 is a diagram illustrating a flow of communication control of the radio communication apparatus in the second embodiment.

FIG. 18 is a diagram illustrating a flow of communication control of the radio communication apparatus 22 in the second embodiment. A flow of processing of the communication control in the second embodiment is explained with reference to FIG. 18. The receiving unit 17 measures a communication quality value of the radio communication apparatus 22 (S61). The threshold determining unit 2 determines, on the basis of a past tendency of the communication quality value, a threshold for deciding a level of communication quality (S62). The ON/OFF deciding unit 15 compares a present value of the communication quality value measured by the receiving unit 17 and the threshold determined by the threshold determining unit 2 and performs threshold decision (S63). The transmitting unit 16 transmits a result of the threshold decision by the ON/OFF deciding unit 15 to the communication control apparatus (S64).

The radio communication apparatus 22 in the second embodiment can transmit the result of the threshold decision to the communication control apparatus. As a result, the radio communication apparatus 22 in the second embodiment can cause the communication control apparatus to perform the communication control disclosed in the present proposal.

<Modification 21>

The radio communication apparatus 22 in the second embodiment directly transmits the result of the threshold decision to the communication control apparatus. When a present value of a communication quality value is smaller than the threshold continuously in a period equal to or longer than a predetermined period, the radio communication apparatus 22 in a modification 21 explained below transmits a result of threshold decision indicating that the present value of the communication quality value is equal to or larger than the threshold.

Figure 19:
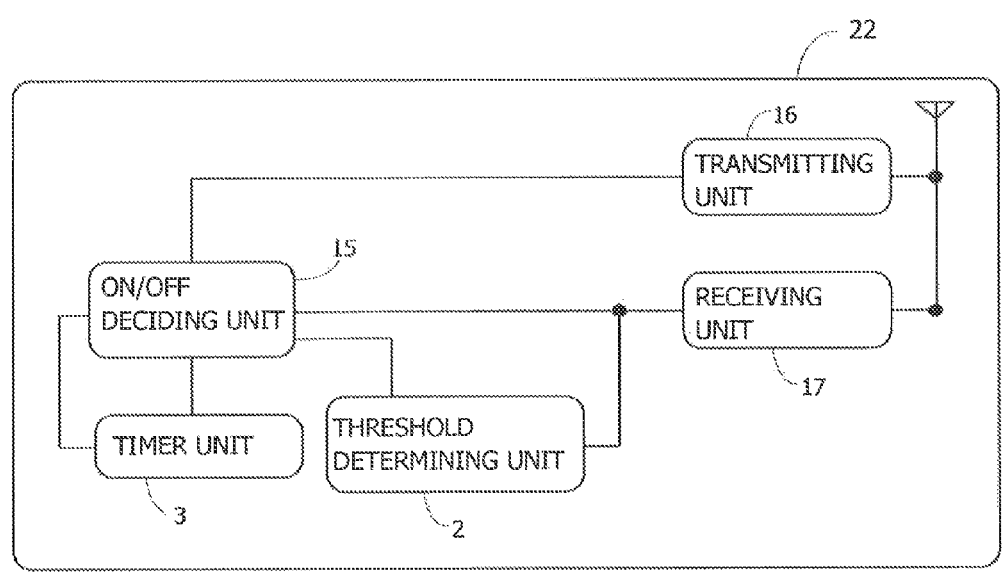
FIG. 19 is a diagram illustrating the configuration of the radio communication apparatus in a modification 21.

FIG. 19 is a diagram illustrating the configuration of the radio communication apparatus 22 in the modification 21. Note that, in FIG. 19, sections related to the modification 21 are described. In FIG. 19, as the configuration of the radio communication apparatus 22 in the modification 21, the threshold determining unit 2, the timer unit 3, the ON/OFF deciding unit 15, the transmitting unit 16, and the receiving unit 17 are illustrated. When the present value of the communication quality value is smaller than the threshold continuously longer than the predetermined period, the timer unit 3 performs timer processing for suspending communication control for blocking transmission of contents. The other components in the modification 21 are the same as the components in the second embodiment. Therefore, the same components as the components in the second embodiment are denoted by the same reference numerals and explanation of the components is omitted.

In FIG. 19, the present value of the communication quality value is directly input to the ON/OFF deciding unit 15 from the receiving unit 17. However, the present value of the communication quality value may be input to the ON/OFF deciding unit 15 from the receiving unit 17 through the threshold determining unit 2.

Figure 20:
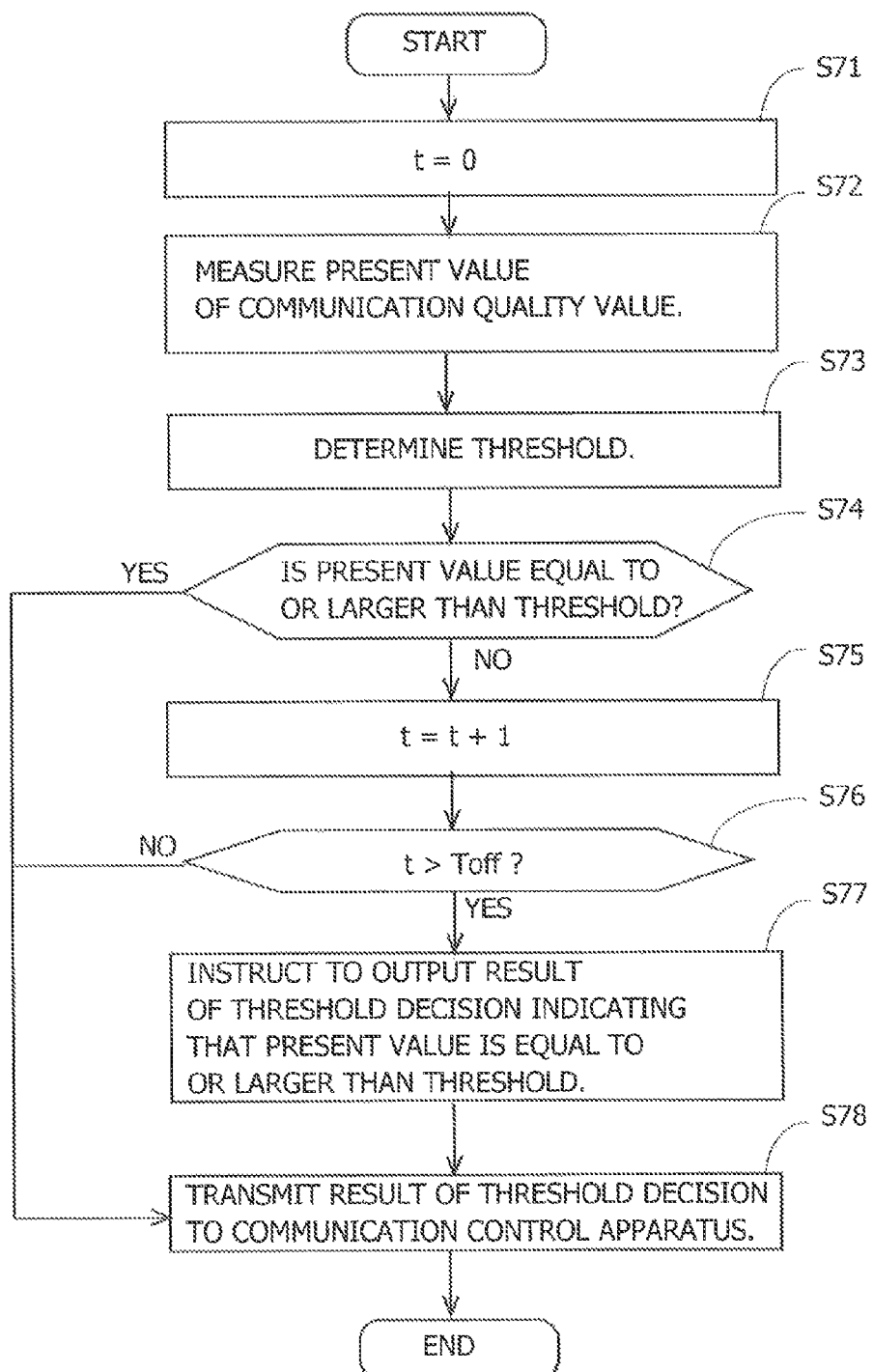
FIG. 20 is a diagram illustrating a flow of communication control of the radio communication apparatus in the modification 21.

FIG. 20 is a diagram illustrating a flow of the communication control of the radio communication apparatus 22 in the modification 21. A flow of processing of communication control in the modification 21 is explained with reference to FIG. 20. The timer unit 3 initializes the timer value t to 0 (S71). The receiving unit 17 measures a communication quality value (S72). The threshold determining unit 2 determines, on the basis of a past tendency of the communication quality value, a threshold for deciding a level of communication quality (S73). The ON/OFF deciding unit 15 performs threshold decision for comparing a present value of the communication quality value and the threshold. When the present value of the communication quality value is equal to or larger than the threshold, the ON/OFF deciding unit 15 advances the processing to S78. When the present value of the communication quality value is smaller than the threshold, the ON/OFF deciding unit 15 advances the processing to S75 (S74). The timer unit 3 increments the timer value t (S75). When the present timer value t is within the predetermined period Toff, the timer unit 3 advances the processing to S78. When the present timer value t exceeds the predetermined period Toff, the timer unit 3 advances the processing to S77 (S76). The timer unit 3 instructs the ON/OFF deciding unit 15 to output a result of threshold decision indicating that the present value of the communication quality value is equal to or larger than the threshold (S77). The transmitting unit 16 transmits the result of the threshold decision to the communication control apparatus (S78).

When the present value of the communication quality value is smaller than the threshold continuously in a period equal to or longer than a predetermined period, the radio communication apparatus 22 in the modification 21 transmits the result of the threshold decision indicating that the present value of the communication quality value is equal to or larger than the threshold to the communication apparatus. If the present value of the communication quality value is equal to or larger than the threshold, the communication control apparatus does not block transmission of contents. As a result, the radio communication apparatus 22 in the modification 21 can improve an event in which the transmission of contents might not be completed.

<Modification 22>

The radio communication apparatus 22 in the second embodiment does not include a configuration for monitoring communication quality. In the radio communication apparatus 22 in a modification 22 explained below, a configuration is illustrated in which processing for monitoring communication quality is added to the radio communication apparatus 22 in the second embodiment.

Figure 21:
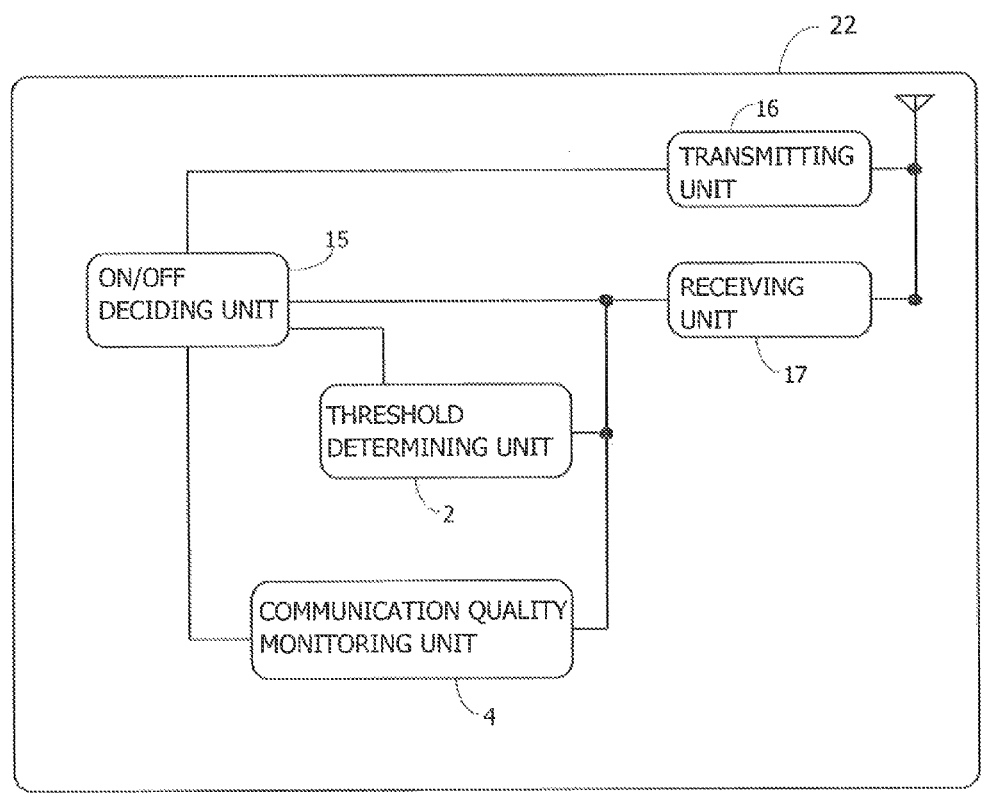
FIG. 21 is a diagram illustrating the configuration of the radio communication apparatus in a modification 22.

FIG. 21 is a diagram illustrating the configuration of the radio communication apparatus 22 in the modification 22. Note that, in FIG. 21, sections related to the modification 22 are described. In FIG. 21, as the configuration of the radio communication apparatus 22 in the modification 22, the threshold determining unit 2, the communication quality monitoring unit 4, the ON/OFF deciding unit 15, the transmitting unit 16, and the receiving unit 17 are illustrated. The components in the modification 22 are the same as the components in the modification 14 or the second embodiment. Therefore, the same components as the components in the modification 14 or the second embodiment are denoted by the same reference numerals and explanation of the components is omitted.

In FIG. 21, a present value of a communication quality value is directly input to the ON/OFF deciding unit 15 from the receiving unit 17. However, the present value of the communication quality value may be input from the receiving unit 17 via the threshold determining unit 2 or the communication quality monitoring unit 4.

The communication quality monitoring unit 4 monitors communication quality of the radio communication apparatus 22. When it is predicted that the communication quality is low and transmission of contents is blocked in a period equal to or longer than a predetermined period if threshold decision is performed, the communication quality monitoring unit 4 instructs the ON/OFF deciding unit 15 to output a result of the threshold decision indicating that the present value of the communication quality value is equal to or larger than a threshold.

FIG. 22 is a diagram illustrating a flow of communication control of the radio communication apparatus 22 in the modification 22. A flow of processing of the communication control in the modification 22 is explained with reference to FIG. 22. The receiving unit 17 measures a communication quality value (S81). The threshold determining unit 2 determines, on the basis of a past tendency of the communication quality value, a threshold for deciding a level of communication quality (S82). The ON/OFF deciding unit 15 carries out the threshold decision. When a present value of the communication quality value is equal to or larger than the threshold, the ON/OFF deciding unit 15 advances the processing to S84 (S83). The communication quality monitoring unit 4 decides whether it is predicted that transmission of contents is blocked in a period equal to or longer than a predetermined period if the threshold decision is performed. When it is predicted that the transmission of contents is blocked in the period equal to or longer than the predetermined period if the threshold decision is performed, the communication quality monitoring unit 4 advances the processing to S85. Otherwise, the communication quality monitoring unit 4 advances the processing to S86 (S84). The communication quality monitoring unit 4 instructs the ON/OFF deciding unit 15 to output a result of the threshold decision indicating that the present value of the communication quality value is equal to or larger than the threshold (S85). The transmitting unit 16 transmits the result of the threshold decision to the communication control apparatus (S86).

When it is predicted that the transmission of contents is blocked in the period equal to or longer than the predetermined period if the threshold decision is performed, the radio communication apparatus 22 in the modification 22 transmits the result of the threshold decision indicating that the present value of the communication quality value is equal to or larger than the threshold to the communication control apparatus. If the present value of the communication quality value is equal to or larger than the threshold, the communication control apparatus does not block the transmission of contents. As a result, the radio communication apparatus 22 in the modification 22 can improve an event in which the transmission of contents does not start.

The embodiments and the modifications disclosed above can be combined with one another. For example, the communication control apparatus 21 in the first embodiment and the radio communication apparatus 22 in the modification 22 can be combined. For example, the communication quality monitoring unit 4 in the modification 17 can be added to the radio communication apparatus 22 in the modification 16.

According to the present proposal, it is possible to effectively utilize resources of the radio relay apparatus.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A communication control method in a radio communication system in which a radio communication apparatus performs communication with another apparatus via a radio relay apparatus, the communication control method comprising:

receiving a communication quality value indicating communication quality between the radio communication apparatus and the radio relay apparatus;

determining, on the basis of a past tendency of the communication quality value, a threshold for deciding a level of the communication quality; and blocking, while a present value of the communication quality value is smaller than the threshold, transmission of contents between the radio communication apparatus and the other apparatus;

wherein communication control for blocking the transmission of the contents is suspended when the present value of the communication quality value is smaller than the threshold and when being predicted that the transmission of contents is blocked in a period equal to or longer than a predetermined period if threshold decision is performed.

2. The communication control method according to claim 1, wherein the blocking is suspended when a period in which the present value of the communication quality value is smaller than the threshold continues longer than a predetermined period.

3. A communication control apparatus used in a radio communication system in which a radio communication apparatus performs communication with another apparatus via a radio relay apparatus, the communication control apparatus comprising a memory storing executable instructions; and a processor connected to the memory and configured to execute the instructions, execution of the instructions causes the processor to:
    obtain a result of threshold decision by comparing a threshold, which is determined on the basis of a past tendency of a communication quality value indicating communication quality between the radio communication apparatus and the radio relay apparatus measured by the radio communication apparatus, to a present value of the communication quality value;
    block, while the present value of the communication quality value is smaller than the threshold in the result of the threshold decision, transmission of contents between the radio communication apparatus and the other apparatus; and
    perform monitoring the communication quality value, and suspend communication control for blocking the transmission of contents, when the present value of the communication quality value is smaller than the threshold as a result of the monitoring and when being predicted that the transmission of the contents is blocked in a period equal to or longer than a predetermined period if threshold decision is performed.

4. The communication control apparatus according to claim 3, wherein the processor obtains the result of the threshold decision by comparing the present value of the communication quality value, indicating communication quality between the radio communication apparatus and the radio relay apparatus, to the threshold, for deciding a level of the communication quality.

5. The communication control apparatus according to claim 3, wherein the result of the threshold decision is transmitted from the radio communication apparatus.

6. The communication control apparatus according to claim 3, wherein the processor executes the process that further causes the communication control apparatus to suspend communication control for blocking the transmission of contents irrespective of the present value of the communication quality value, when a period in which the present value of the communication quality value is smaller than the threshold exceeds a predetermined period in the result of the threshold decision.

7. A radio communication apparatus, comprising a memory storing executable instructions; and a processor connected to the memory and configured to execute the instructions, execution of the instructions causes the processor to:
    measure a communication quality value indicating communication quality in communication with a radio relay apparatus;
    determine, on the basis of a past tendency of the communication quality value, a threshold for deciding a level of the communication quality;
    perform threshold decision for comparing a present value of the communication quality value and the threshold;
    receive, as an input, the result of the threshold decision, and transmit a result of the threshold decision to a communication control apparatus that performs communication control for blocking transmission of contents while the present value of the communication quality value is smaller than the threshold; and
    perform monitoring the communication quality value, and output a result of the threshold decision indicating that the present value of the communication quality value is equal to or larger than the threshold irrespective of the present value of the communication quality value, when the present value of the communication quality value is smaller than the threshold as a result of the monitoring and when being predicted that the transmission of the contents is blocked in a period equal to or longer than a predetermined period if threshold decision is performed.

8. The radio communication apparatus according to claim 7, wherein the processor executes the process that further causes the radio communication apparatus to output a result of the threshold decision indicating that the present value of the communication quality value is equal to or larger than the threshold irrespective of the present value of the communication quality value, when a period in which the present value of the communication quality value is smaller than the threshold exceeds a predetermined period in the result of the threshold decision.

* * * * *